(12) United States Patent
Nagakura et al.

(10) Patent No.: US 8,650,227 B2
(45) Date of Patent: Feb. 11, 2014

(54) STORAGE MEDIUM, DETERMINATION METHOD, AND APPARATUS

(75) Inventors: Shinnosuke Nagakura, Kawasaki (JP); Kenichi Shimazaki, Kawasaki (JP); Satoshi Matsuda, Kawasaki (JP); Kazunao Muramoto, Kawasaki (JP); Akio Oba, Kawasaki (JP); Hiroki Matsueda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 20 days.

(21) Appl. No.: 13/432,048

(22) Filed: Mar. 28, 2012

(65) Prior Publication Data

US 2012/0296943 A1    Nov. 22, 2012

(30) Foreign Application Priority Data

May 16, 2011  (JP) .................................. 2011-109755

(51) Int. Cl.
*G06F 17/30* (2006.01)

(52) U.S. Cl.
USPC ............................ 707/812; 707/821; 707/829

(58) Field of Classification Search
USPC ................................................. 707/821, 829
See application file for complete search history.

(56) References Cited

U.S. PATENT DOCUMENTS

| | | | | |
|---|---|---|---|---|
| 7,987,152 | B1 * | 7/2011 | Gadir ............................ | 707/602 |
| 8,082,222 | B2 * | 12/2011 | Rangarajan et al. .......... | 707/609 |
| 2008/0114770 | A1 * | 5/2008 | Chen et al. ...................... | 707/10 |
| 2010/0115100 | A1 * | 5/2010 | Tubman et al. ............... | 707/227 |
| 2010/0161577 | A1 * | 6/2010 | Morozov ....................... | 707/705 |
| 2011/0202529 | A1 * | 8/2011 | Waschke ........................ | 707/737 |

FOREIGN PATENT DOCUMENTS

| | | |
|---|---|---|
| JP | 2009-217463 | 9/2009 |
| JP | 2010-191799 | 9/2010 |

OTHER PUBLICATIONS

Configuration Management Database (CMDB) Federation Specification, Ver.1.0.1, pp. 1-74, Distributed Task Force Management (DMTF), Apr. 22, 2010.

* cited by examiner

*Primary Examiner* — John E Breene
*Assistant Examiner* — Andalib Lodhi
(74) *Attorney, Agent, or Firm* — Fujitsu Patent Center

(57) ABSTRACT

A storage medium stores a program thereon. The program instructs a computer to perform a process. The process comprises storing first information indicating dependency relationship between types into a storage, the types corresponding to configuration elements included in a system; acquiring relational information and type information from plural databases, the relational information indicating dependency relationships between plural configuration elements, the type information indicating the types of the plural configuration elements; generating second information indicating dependency relationships between a certain configuration element included in the plural configuration elements and each of configuration elements indicating dependency relation with the certain configuration element; generating third information indicating that the certain configuration element and the each of the configuration elements has the dependency relation indicated in the generated second information based on the type information and determining whether the generated third information is coincident with the first information stored in the storage.

20 Claims, 19 Drawing Sheets

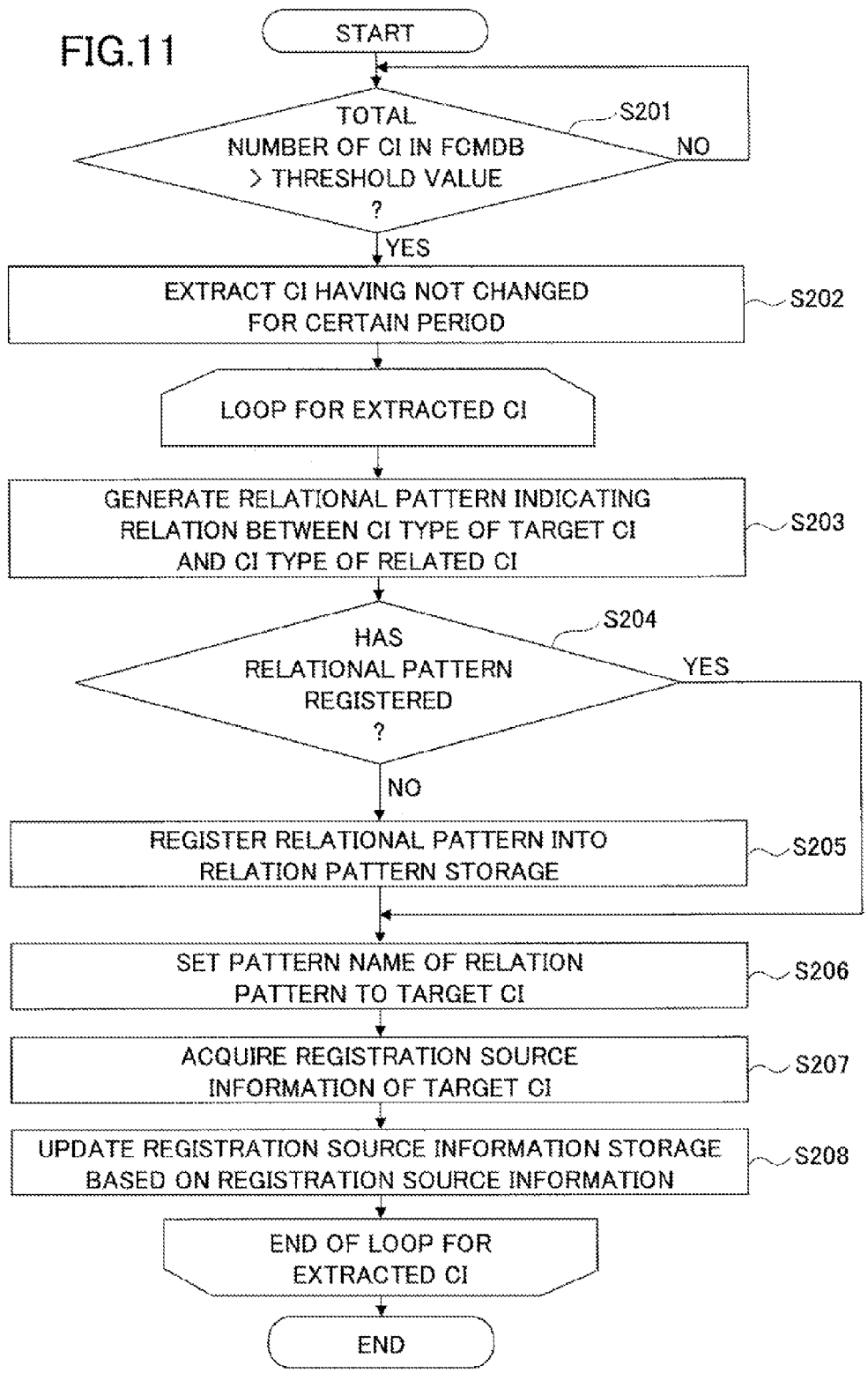

FIG.12

RATIONAL PATTERN STORAGE 122

| CI TYPE NAME | PATTERN NAME | RELEVANT CI TYPE | |
| --- | --- | --- | --- |
| | | SECTION | CI TYPE NAME |
| SERVER | A | REFERENCE SOURCE | PHYSICAL SERVER |
| | B | REFERENCE SOURCE | SERVICE |
| | | REFERENCE DESTINATION | SOFTWARE |
| | C | REFERENCE SOURCE | DOMAIN |
| | | REFERENCE DESTINATION | PATCH |
| | | REFERENCE DESTINATION | SOFTWARE |
| | D | REFERENCE SOURCE | CI TYPE 1 |
| | | REFERENCE SOURCE | ... |
| | | REFERENCE DESTINATION | CI TYPE 2 |
| SOFTWARE | E | REFERENCE SOURCE | SERVER |
| DOMAIN | | REFERENCE SOURCE | ... |
| | | REFERENCE DESTINATION | SERVER |
| ... | | ... | ... |

Ra, Rb

FIG.13
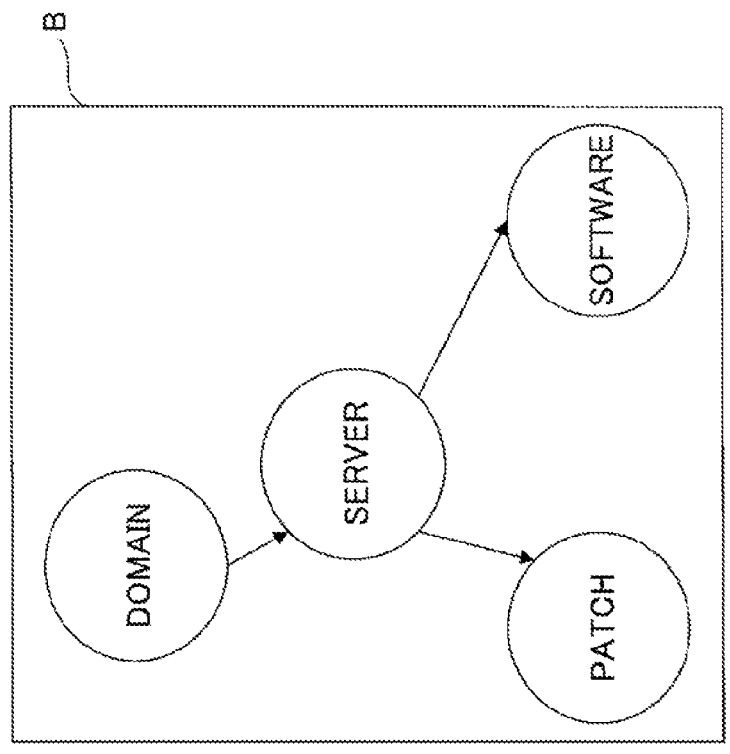
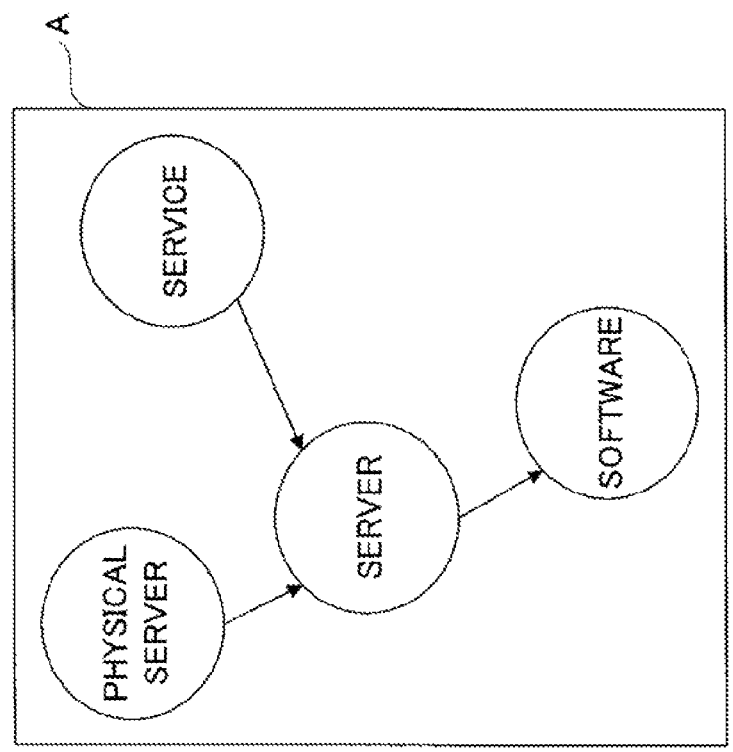

| CI TYPE NAME | RELATIONAL PATTERN | SUM | REGISTRATION SOURCE INFORMATION STORAGE | | | REGISTRATION SOURCE EXISTENCE DEGREE (NUMBER OF REGISTRATIONS/SUM) |
|---|---|---|---|---|---|---|
| | | | REGISTRATION MDR NAME | AVERAGE REGISTRATION TIME (S) | NUMBER OF REGISTRATIONS | |
| SERVER | A | 100 | MDR1 | 0 | 100 | 100% |
| | | | MDR2 | 1800 | 100 | 100% |
| | | | MDR3 | 1750 | 100 | 100% |
| | | | MDR4 | 86400 | 1 | 1% |
| | B | 86 | MDR1 | 86400 | 2 | 2% |
| | | | MDR3 | 60 | 86 | 100% |
| | | | MDR4 | 120 | 45 | 52% |
| | C | 124 | MDR1 | 0 | 124 | 100% |
| | | | MDR2 | 1800 | 61 | 49% |
| | | | MDR3 | 1750 | 3 | 2% |
| | | | MDR4 | 86400 | 124 | 100% |
| SOFTWARE | D | 300 | MDR2 | 0 | 300 | 100% |
| DOMAIN | E | 50 | MDR4 | 0 | 50 | 100% |
| ... | ... | ... | ... | ... | ... | |

REGISTRATION WAITING CHECK LIST 124

| REGISTRATION SCHEDULE TIME | REGISTRATION WAITING MDR | ID |
|---|---|---|
| 2010/12/13 12:03:05 | MDR2 | NNNNNNNN01 |
| 2010/12/13 12:03:20 | MDR3 | NNNNNNNN02 |
| 2010/12/13 12:03:21 | MDR2 | NNNNNNNN03 |
| 2010/12/13 12:03:25 | MDR2, MDR3, MDR4 | NNNNNNNN04 |
| 2010/12/13 12:03:48 | MDR3 | NNNNNNNN05 |
| 2010/12/13 12:04:01 | ... | ... |
| ... | | |

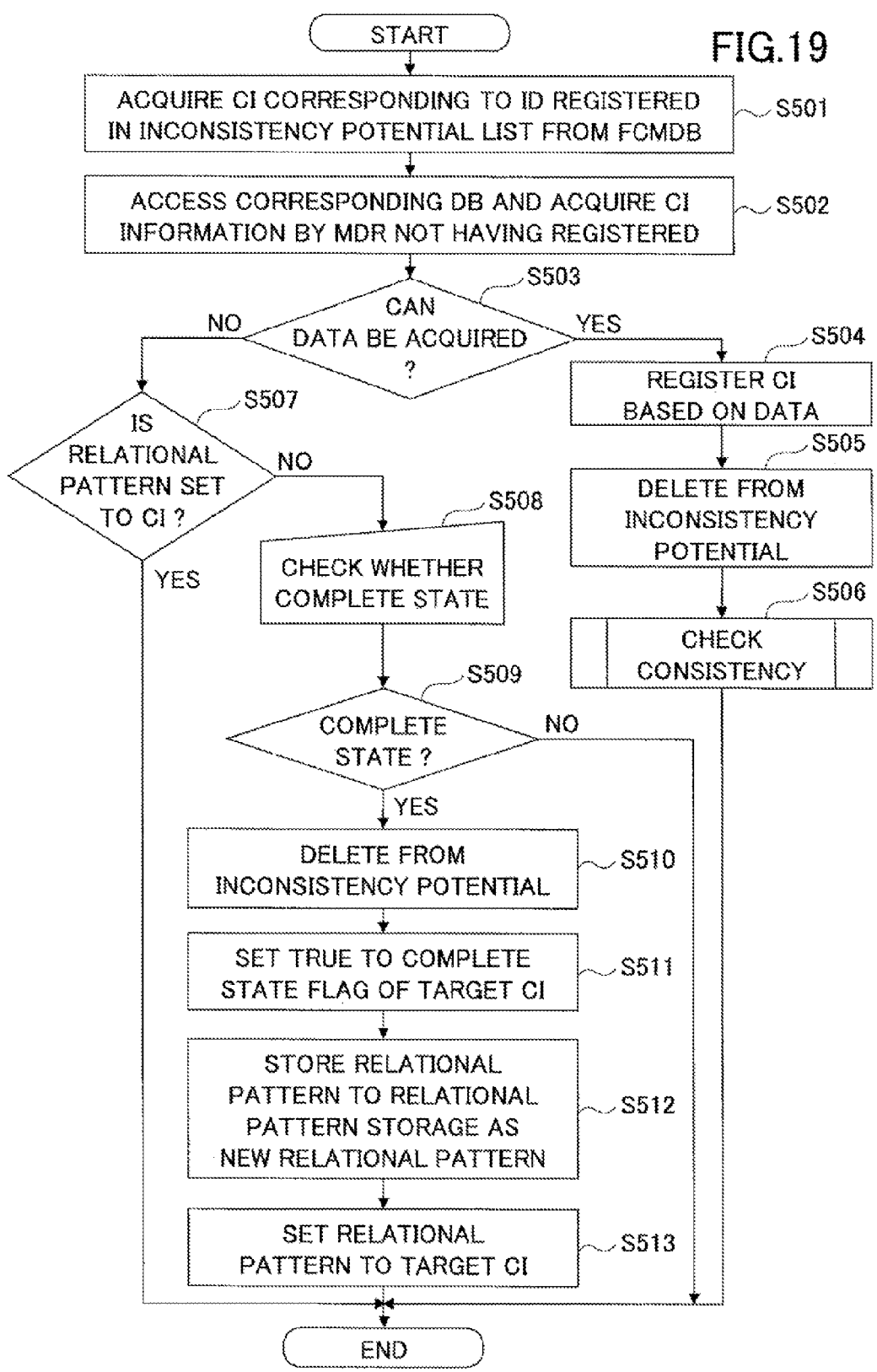

STORAGE MEDIUM, DETERMINATION METHOD, AND APPARATUS

CROSS-REFERENCE TO RELATED APPLICATION

This application is based upon and claims the benefit of priority of Japanese Patent Application No. 2011-109755, filed May 16, 2011, the entire contents of which are incorporated herein by reference.

FIELD

The embodiment discussed herein is related to a determination program, a determination method, and a determination apparatus.

BACKGROUND

Recently, to centrally manage data separately provided, extensive studies have been made on the specifications of a Configuration Management Database (CMDB) storing configuration information of operations and management of an IT system (see, for example, "Configuration Management Database (CMDB) Federation Specification", on line, Apr. 22, 2010, searched on Apr. 13, 2011, over the Internet, (URL: http://dmtf.org/sites/default/files/standards/documents/DSP0252_1.0.1_0.pdf).

In an IT system, a configuration element managed by the CMDB is called a Configuration Item (CI). In the CMDB, information items of the CIs, dependency relationships between the CIs and the like are managed. To achieve (form) the CMDB, the above specification employs an approach of virtually integrating plural existing databases managing configuration elements of an IT system.

A manager that achieves the virtually integrated database is called a Federating CDMB (FCMDB). Further, an agent that acquires data of the CIs managed in an existing database (CMDB) and data indicating the relationship (or link) between the CIs, converts the format of the acquired data into a format in accordance with the FCMDB, and registers the data having the converted format in the FCMDB is called a Management Data Repository (MDR). In the FCMDB, the data of the CIs registered by the MDR and the data indicating the relationships between the CIs are integrated and managed.

For related art, references may be made to Japanese Laid-open Patent Publication Nos. 2010-191799 and 2009-217463.

SUMMARY

According to an aspect of the present invention, a non-transitory computer-readable storage medium storing a program is disclosed. The program instructs a computer to perform a process, the process including storing first information into a storage, the first information indicating dependency relationships between types, the types corresponding to configuration elements included in a system; acquiring relational information and type information from plural databases storing the relational information and the type information, the relational information indicating dependency relationships between plural configuration elements included in a system to be managed, the type information indicating the types of the plural configuration elements; generating second information indicating dependency relationships between a certain configuration element included in the plural configuration elements and each of configuration elements indicating dependency relationships with the certain configuration element, the dependency relationships being included in the acquired relational information; generating third information indicating that the certain configuration element and each of the configuration elements has the dependency relationship indicated in the generated second information based on the type information; and determining whether the generated third information is coincident with the first information stored in the storage.

The objects and advantages of the embodiments disclosed herein will be realized and attained by means of the elements and combinations particularly pointed out in the claims.

It is to be understood that both the foregoing general description and the following detailed description are exemplary and explanatory and are not restrictive of the invention as claimed.

BRIEF DESCRIPTION OF DRAWINGS

FIG. 11 is a flowchart illustrating an example generation process of a relational pattern;

FIG. 12 illustrates an example configuration of a relational pattern storage;

FIG. 13 illustrates an example of the relational pattern;

FIG. 14 illustrates an example configuration of a registration source information storage;

FIG. 16 illustrates an example configuration of a registration waiting check list storage;

FIG. 19 a flowchart illustrating an example process of checking the consistency of the CI registered in an inconsistency potential storage.

DESCRIPTION OF EMBODIMENTS

The data registered into the FCMDB by the MDR may not be integrated in the FCMDB due to inconsistencies such as different timings of registering data by the different MDRs, a format conversion failure by the MDR, erroneous data when stored in the CMDB already and the like.

Figure 1:
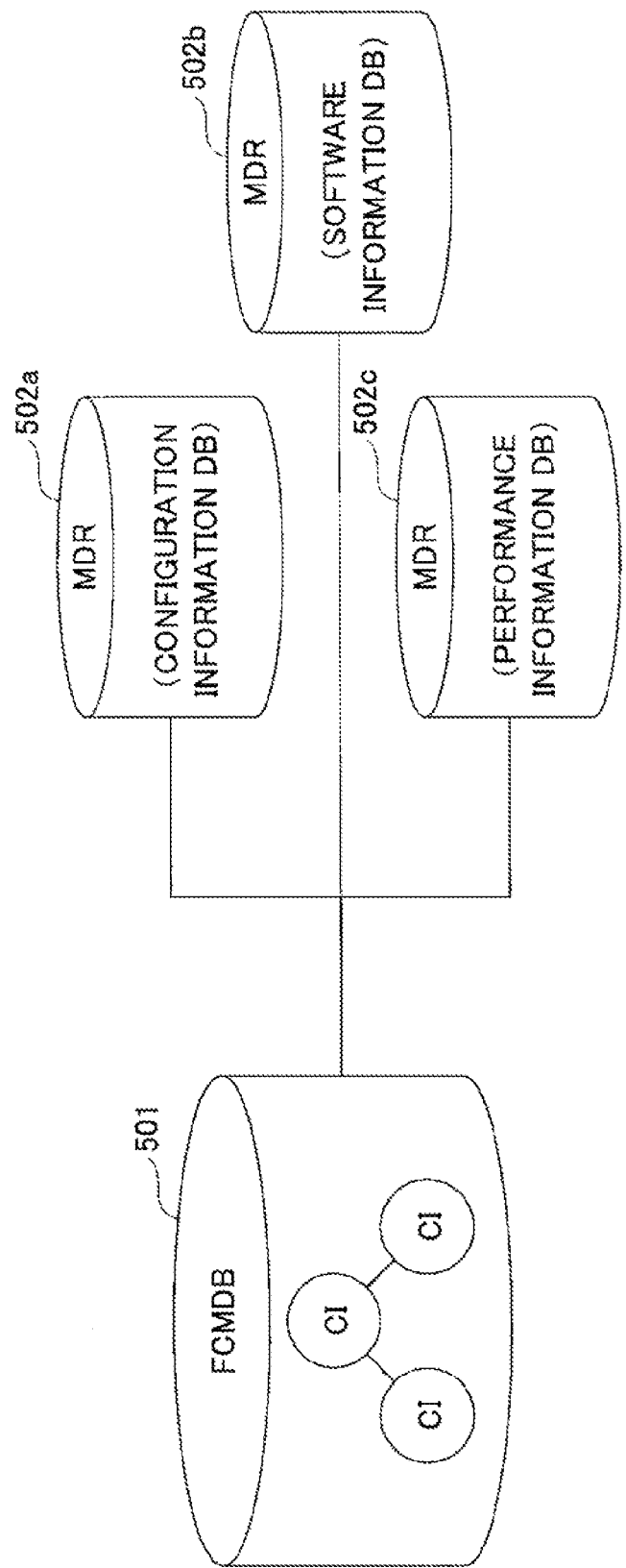
FIG. 1 illustrates an example virtual integration of existing databases according to an embodiment.

In the following, an embodiment of the present invention is described with reference to the accompanying drawings. FIG. 1 illustrates an example of a virtual integration according to an embodiment of existing databases. In FIG. 1, there are three MDRs 502a through 502c and an FCMDB 501. The MDR 502a is an agent corresponding to a configuration information DB that manages information related to a server computer (hereinafter simplified as "server") and other configuration components included in an IT system.

The information includes a name of the CI, classified category indicating software, hardware, document data or the like, installation site, cost, a name of the manager, a current status and the like. The MDR 502b is an agent corresponding to a software information DB that manages information of software installed in the servers. The MDR 502c is an agent corresponding to a performance information DB that manages the performance (specifications) of the servers. Herein, the configuration information DB, the software information DB, and the performance information DB are examples of an existing database (DB).

The FCMDB 501 integrates information of the CIs registered by the MDRs 502a through 502c and the relationships (dependency relationships) between the CIs. In FIG. 1, the lines connecting the CIs indicate the relationships between the CIs. For example, the servers managed in the configuration information DB, the software information DB, and the performance information DB and the software managed in the software information DB are registered in the FCMDB as the corresponding CIs.

Further, based on relational information between the servers and software managed in the software information DB, relational information between the CI corresponding to the server and the CI corresponding to the software is registered in the FCMDB.

An example of the data registered by the MDR 502b is described with reference to FIG. 2.

Figure 2:
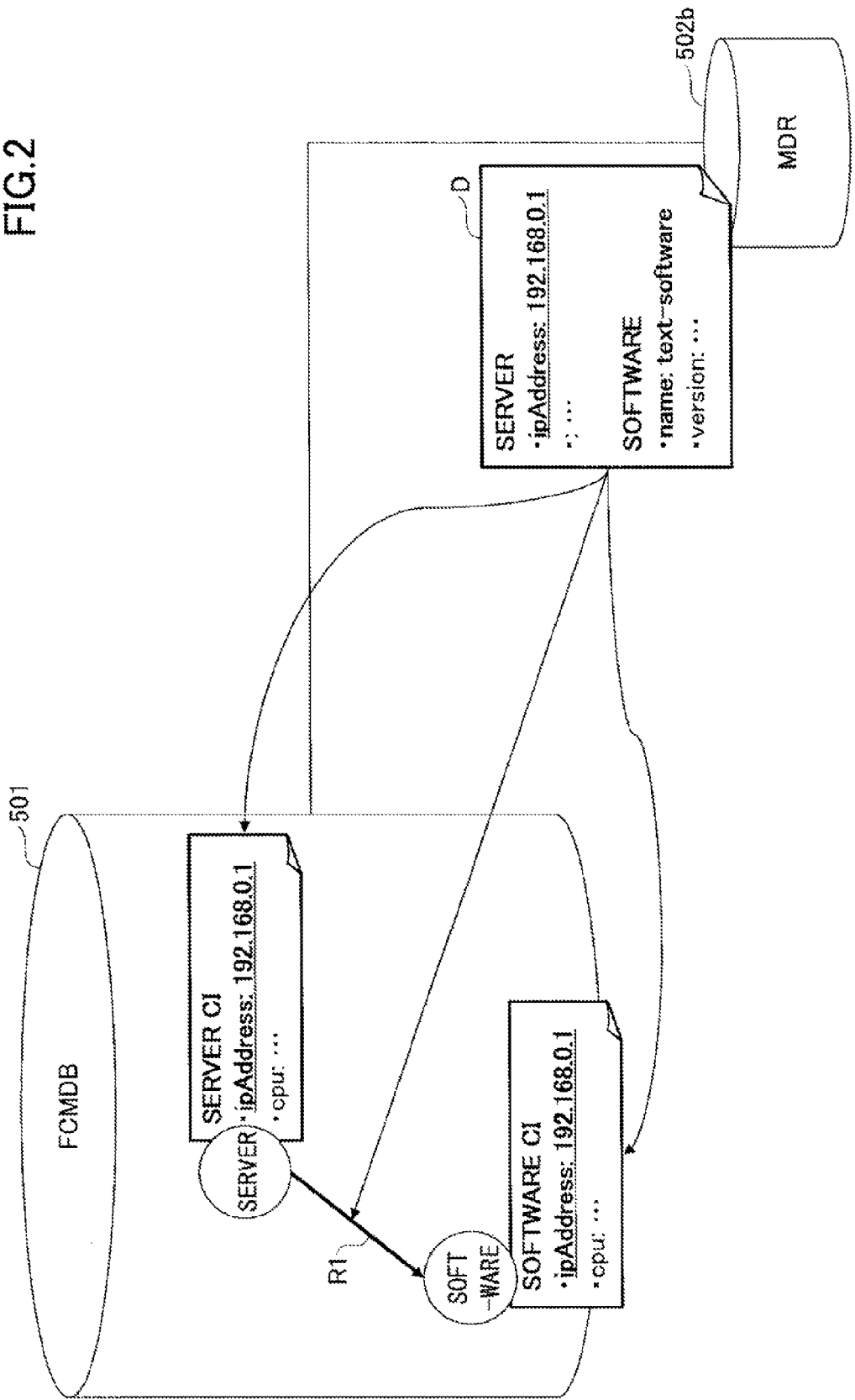
FIG. 2 illustrates a specific example of data registered by an MDR.

FIG. 2 illustrates an example of the data registered by the MDR 502b. In FIG. 2, the data D is the data registered by the MDR 502b. The data D includes information of a specific server, information of software installed in the specific server, relational information between the specific server and the software and the like.

Based on the data D, the CI corresponding to the specific server and the CI corresponding to the software installed in the specific server are registered in the FCMDB 501. Further, the relational information R1 indicating the relationship between the server and the software is also registered in the FCMDB 501.

The FCMDB 501 integrates plural data registered by the corresponding MDRs and also corresponding to the same entity (e.g., a specific server) and stores the integrated data as a single CI. For example, when a server (hereinafter "server A") is added, the data of the server A are registered in the configuration information DB, the software information DB, and the performance information DB of FIG. 1 by an manager or the like.

The MDRs 502a through 502c corresponding to the existing data bases register the data in the FCMDB 501, the data corresponding to the server A and being registered in the existing data bases.

The FCMDB 501 determines that the data correspond to the same entity (sever A), and integrates the data into a single CI. As described above, a process of integrating plural data corresponding to the same entity into a single CI is called "reconciliation".

Figure 3:
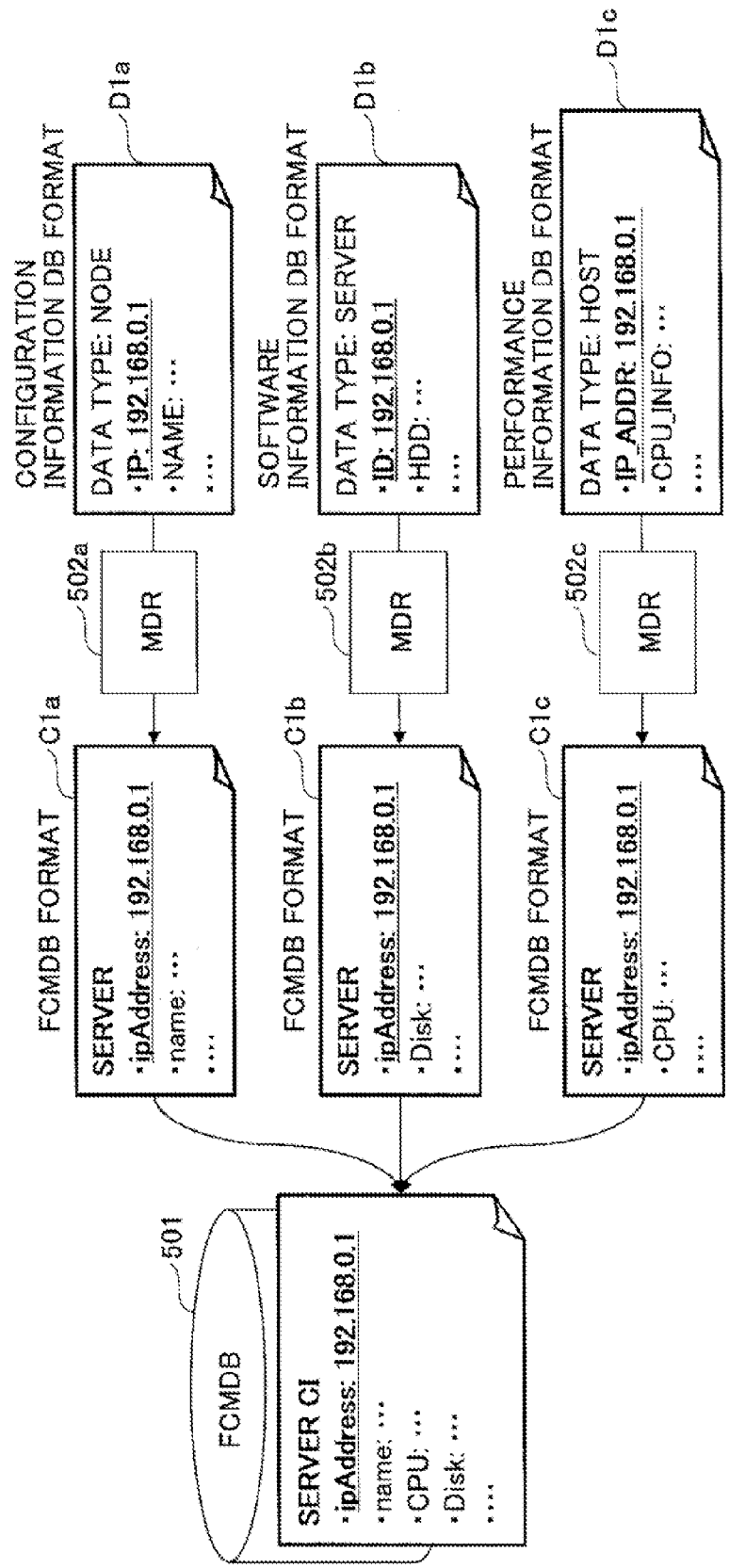
FIG. 3 illustrates an example reconciliation.

FIG. 3 illustrates an example of the reconciliation. In FIG. 3, data D1a, D1b, and D1c refer to the data corresponding to the same server A and being managed by the configuration information DB, the software information DB, and the performance information DB, respectively.

The structure (schema) of the databases may not be necessarily identical to each other. Therefore, even if the data managed in those different databases correspond to the same server A, the data formats of the data in those databases may be different from each other. For example, in data D1a, the type of the data (data type) of the server A is "node", and the attribute item indicating the IP address is "IP".

On the other hand, in data D1b, the data type of the server A is "server", and the attribute item indicating the IP address is "ID". Further, in data D1c, the data type of the server A is "host", and the attribute item indicating the IP address is "IP_ADDR".

The MDRs 502a through 502c convert the formats of data D1a through D1c in the corresponding databases into a format corresponding to the FCMDB 501 (FCMDB format). Namely, as illustrated in FIG. 3, the MDR 502a converts the data D1a into a data C1a; the MDR 502b converts the data D1b into a data C1b; and the MDR 502c converts the data D1c into a data C1c.

As a result, the data D1a through D1c are converted into data C1a through C1c, respectively, having the same data format (i.e., FCMDB format). For example, in data C1a through C1c, the type of the CI (CI type) indicating the server A is "server", and the attribute item indicating the IP address is "ipAdress". The MDRs 502a through 502c register the corresponding data C1a through C1c having the FCMDB format into the FCMDB 501.

Figure 5:
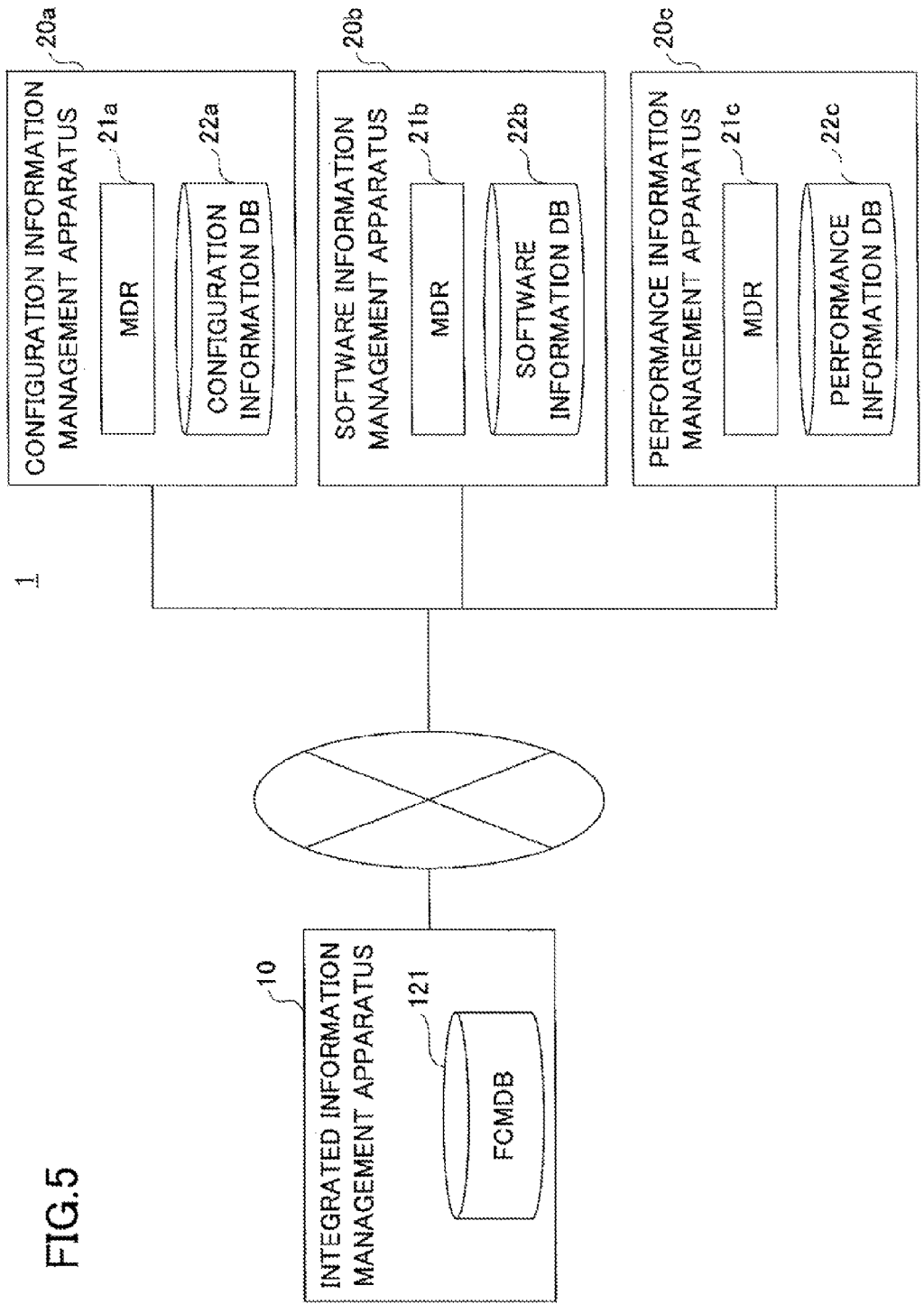
FIG. 5 illustrates an example configuration of a configuration management support system according to an embodiment.

The FCMDB 501 determines that the data C1a through C1c are the data corresponding to the same entity, and integrates and stores the data C1a through C1c into a single CI. The attribute item used to determine the identity of the entity is called a reconcile key. In the example of FIG. 5, the reconcile key of the CIs having the CI type "server" is "ipAddress".

Namely, the FCMDB 501 determines that the identity of the entity corresponding to the data C1a through C1c based on the identity of the value of the "ipAddress" of the data C1a through C1c. In other words, when the value of the "ipAddress" is the same among the data C1a through C1c, the FCMDB 501 determines that the entities corresponding to the data C1a through C1c are identical.

The registration of the data into the FCMDB 501 is independently performed by the MDRs. For example, the MDR 502a registers data into the FCMDB 501 regardless of the registrations by the MDR 502b and the MDR 502c. This also applies to the MDR 502b and the MDR 502c.

Therefore, for example, when inconsistency exists between the existing databases due to, for example, a failure in one of the existing databases, it may be difficult for the MDRs to detect (recognize) the inconsistency. Further, the FCMDB 501 assumes that the data from the MDRs are correct and registers the data as the CI. Therefore, it may also be difficult for the FCMDB 501 detect the inconsistency. As a result, the inconsistency between the existing databases may (directly) influence the data registered in the FCMDB 501.

Figure 4:
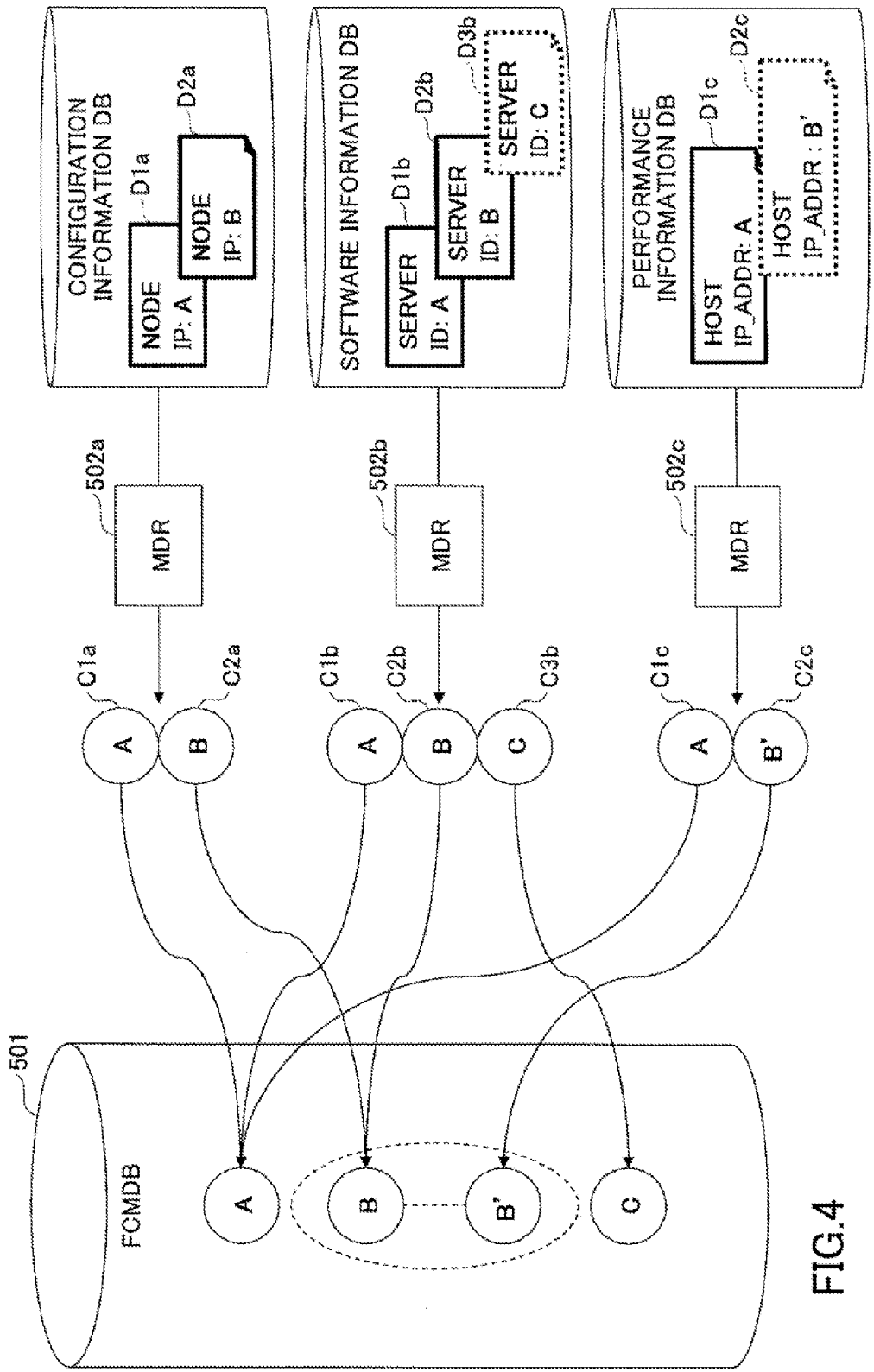
FIG. 4 illustrates an example inconsistency having occurred in an FCMDB.

FIG. 4 illustrates an example where inconsistency between the existing databases influences the data registered in the FCMDB 501. As illustrated in FIG. 4, in the configuration information DB, the data D1a of the server A and the data D2a of the server B are correctly registered. In response to an update of the configuration information DB, the MDR 502a converts the data D1a and D2a into the data C1a of the server A and C2a of the server B, respectively, the data C1a and C2a having the FCMDB format. The MDR 502a registers the data C1a and C2a into the FCMDB 501.

In the software information DB, the data D1b of the server A and the data D2b of the server B are correctly registered. However, due to some failure in the software information DB, the data D3b of the server C having no entity are also registered in the software information DB.

In response to an update of the software information DB, the MDR 502b converts the data D1b, D2b, and D3b into the data C1b of the server A, C2b of the server B, and C3b of the server C, respectively, the data C1b, C2b, and C3b having the FCMDB format. The MDR 502b registers the data C1b, C2b, and C3b into the FCMDB 501.

In the performance information DB, the data D1c of the server A are correctly registered. However, due to some failure in the performance information DB, the data D2c having wrong IP address data of the server B are also registered in the performance information DB. Due to the wrong IP address data of the server B, the data D2c corresponds to a server B'.

In response to an update of the performance information DB, the MDR 502c converts the data D1c and D2c into the data C1c of the server A and C2c of the server B', respectively, the data C1c and C2c having the FCMDB format. The MDR 50c registers the data C1c and C2c into the FCMDB 501.

The FCMDB 501 having the registered data described above may determine the identity of the entity corresponding to the data C1a, C1b, and C1c of the server A, so that the data C1a, C1b, and C1c are integrated into a single CI. Similarly, the FCMDB 501 may determine the identity of the entity corresponding to the data C2a and C2b of the server B, so that the data C2a and C2b are integrated into a single CI.

However, the C2c that should be integrated into the CI of the server B may not be integrated into the CI of the server B. As a result, a CI of the server B' is generated in the FCMDB 501. Further, the CI corresponding to the data C3b of sever C that should not fundamentally exist are also registered in the FCMDB 501.

As a result, wrong data may be generated in the FCMDB 501 because the CI of the server B' that should be integrated into the CI of the server B is not integrated into the CI of the server B and the CI of the server C that does not fundamentally exist is registered.

As a result, when a user refers to the FCMDB 501, it may be difficult for the user to know the correct configuration information. Therefore, by having the configuration and performing the processes described below, a configuration management support system according to an embodiment may detect the possibility of the inconsistency described above.

FIG. 5 illustrates an example configuration of a configuration management support system according to an embodiment of the present invention. As illustrated in FIG. 5, a configuration management support system includes an integrated information management apparatus 10, a configuration information management apparatus 20a, a software information management apparatus 20b, and a performance information management apparatus 20c which are connected to each other via a network such as a LAN (Local Area Network), the Internet, and the like. A wireless path may be partially or entirely included in the network.

In the following, when it is not necessary to distinguish those configuration information management apparatus 20a, the software information management apparatus 20b, and the performance information management apparatus 20c, a term "information management apparatus 20" may be simply (collectively) used.

The integrated information management apparatus 10 is a computer including a Federating Configuration Management Database (FCMDB) 121. The FCMDB 121 virtually integrates and stores the data managed by a database 22 (the configuration information DB 22a, the software information DB 22b, and the performance information DB 22c) of the corresponding information management apparatuses 20 in FIG. 5. Namely, the FCMDB 121 stores an integrated configuration item (CI). A single CI corresponds to one record (data) in the FCMDB 121.

The configuration information management apparatus 20a is a computer including the configuration information database 22a, an MDR 21a and the like. The configuration information DB 22a is a database 22 that manages information related to a server computer (hereinafter simplified as "server") and other configuration components (e.g., a network device) included in an IT system.

The information includes a name of the CI, classified category indicating software, hardware, document data or the like, installation site, cost, a name of the manager, a current status and the like. The MDR 21a is software that converts the format of the data to be updated into data having a format in accordance with the FCMDB 121 (hereinafter "FCMDB" format) and registers the converted data into the FCMDB 121 in response to the update of the configuration information DB 22a.

The software information management apparatus 20b is a computer including the software information DB 22b, an MDR 21b and the like. The software information DB 22b is a database 22 that manages information of software installed in the server. The MDR 21b is software that converts the format of the data to be updated into data having the FCMDB format and registers the converted data into the FCMDB 121 in response to the update of the software information DB 22b.

The performance information management apparatus 20c is a computer including the performance information DB 22c, an MDR 22c and the like. The performance information DB 22c is a database 22 that manages information of the performance (specification) of the servers. The MDR 21c is software that converts the format of the data to be updated into data having the FCMDB format and registers the converted data into the FCMDB 121 in response to the update of the performance information DB 22c.

The databases 22 of the information management apparatuses may manage the data corresponding to the same entity. For example, the information of the specific server A may be managed by each of the configuration information DB 22a, the software information DB 22b, and the performance information DB 22c.

Further, the data managed by the information management apparatuses and illustrated in FIG. 5 are an example only. Namely, the data integrated in the FCMDB 121 are not limited to data managed by a specific database. When it is necessary to integrate data managed by a database, the MDR1 corresponding to the data may be provided.

Figure 6:
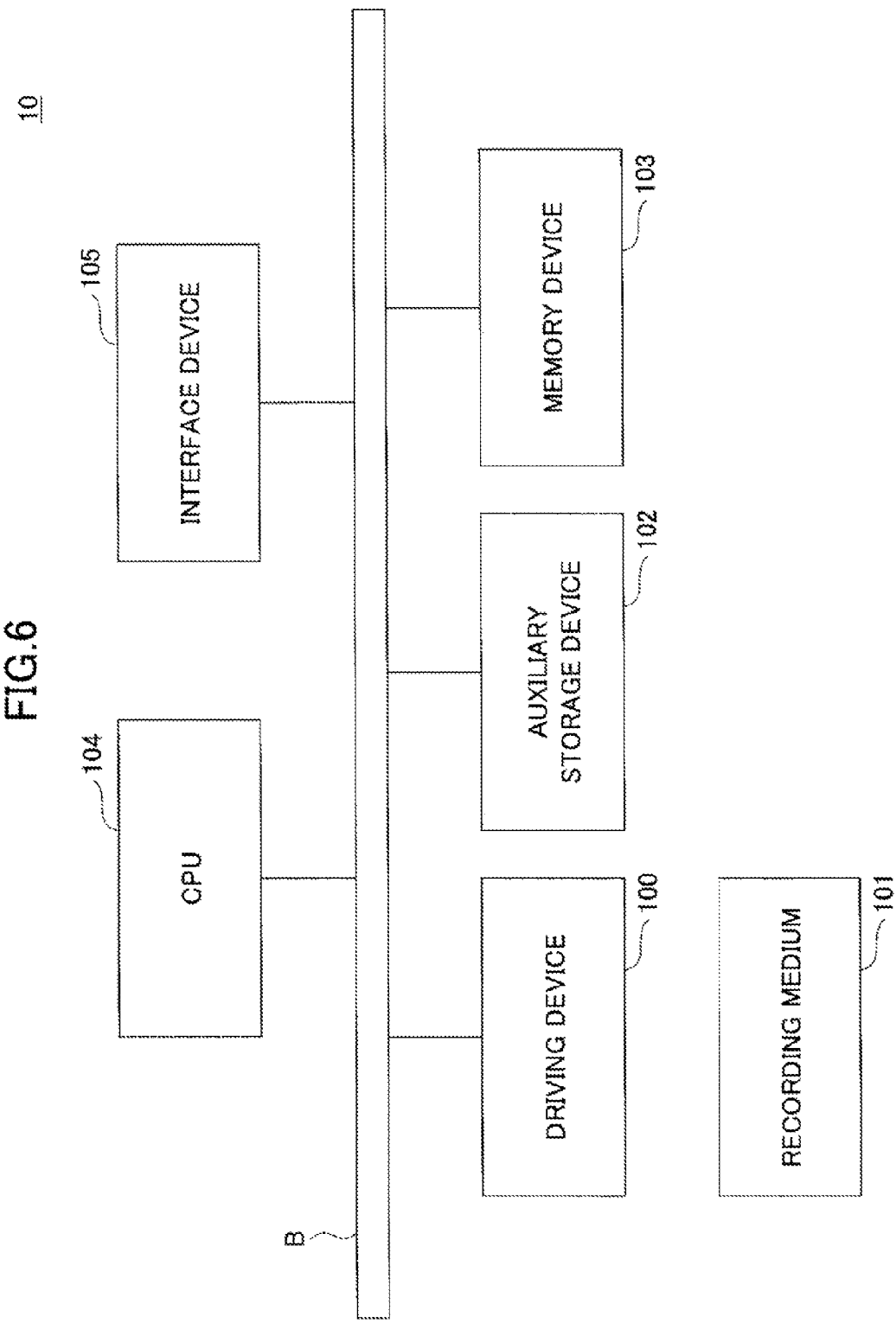
FIG. 6 illustrates an example hardware configuration of an integration information management apparatus according to an embodiment.

FIG. 6 illustrates an example hardware configuration of the integrated information management apparatus 10 according to an embodiment. As illustrated in FIG. 6, the integrated information management apparatus 10 includes a driving device 100, an auxiliary storage device 102, a memory device 103, a CPU (Central Processing Unit) 104, and an interface device 105.

The program that realizes the processes performed by the integrated information management apparatus 10 may be provided by a recording medium 101. Namely, when the recording medium 101 is set (inserted) in the driving device 100, the program is installed from the recording medium 101 into the auxiliary storage device 102 via the driving device 100.

However, it is not always necessary to install the program by using the recording medium 101. For example, the program may be downloaded from another (an external) computer via a network. The auxiliary storage device 102 stores the installed program and necessary files and data as well.

When the program is instructed to start, the program is loaded from the auxiliary storage device 102 into the memory device 103. The CPU 104 executes the functions of the integrated information management apparatus 10 in accordance with the program loaded in the memory device 103. The interface device 105 is used to connect to a network.

As the recording medium 101, for example, a portable recording medium including a CD-ROM, a DVD disk, a USB memory and the like may be used. As the auxiliary storage device 102, for example, an HDD (Hard Disk Drive), a flash memory or the like may be used. Both the recording medium 101 and the auxiliary storage device 102 correspond to a computer-readable recording medium.

For example, the information management apparatus 20 may have the hardware configuration of FIG. 6.

Figure 7:
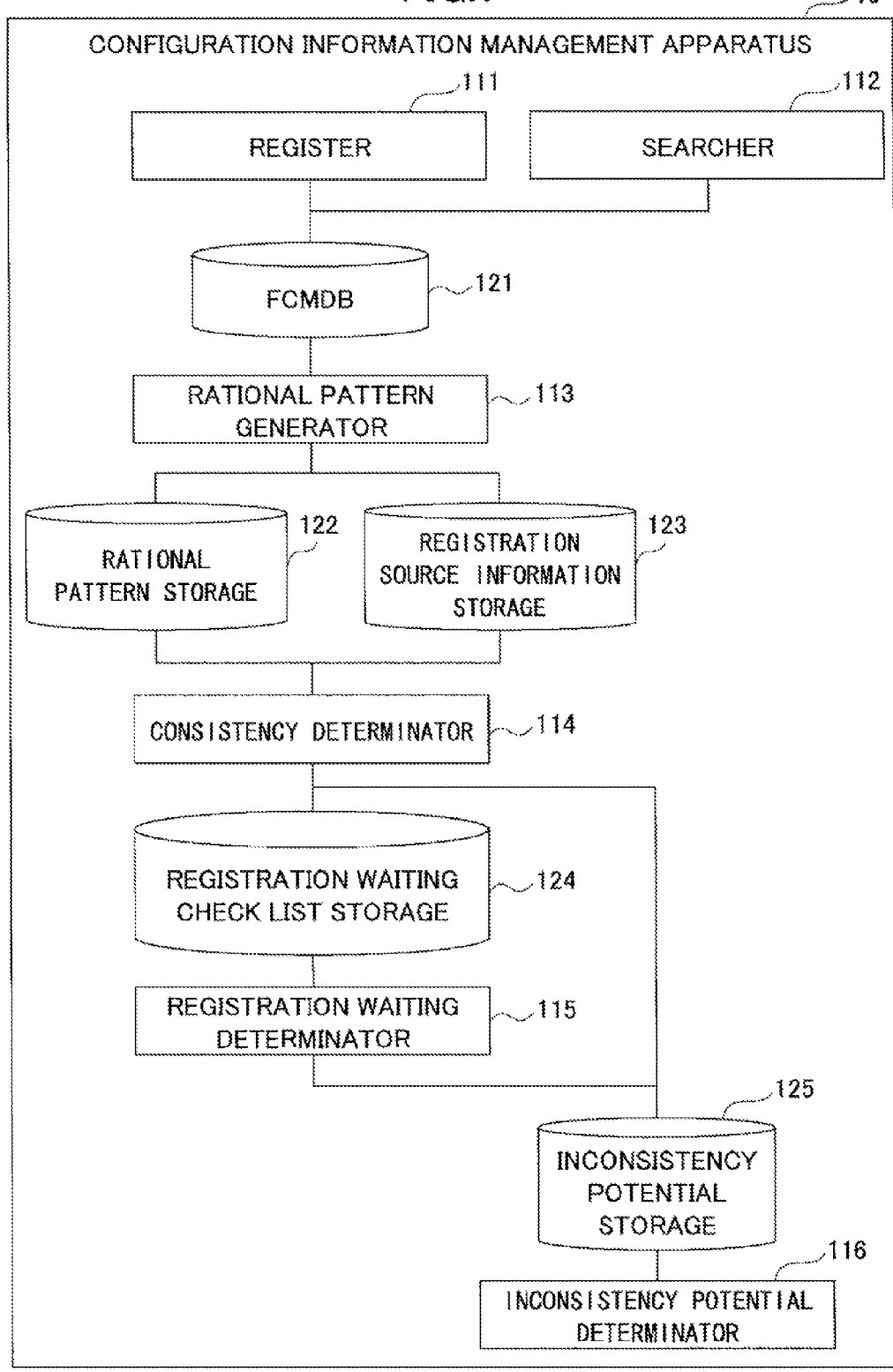
FIG. 7 illustrates an example functional configuration of the integration information management apparatus.

FIG. 7 is an example functional block diagram (configuration) of the integrated information management apparatus 10. As illustrated in FIG. 7, the integrated information management apparatus 10 includes a register 111, a searcher 112, a relational pattern generator 113, a consistency determinator 114, a registration waiting determinator 115, and an inconsistency potential determinator 116.

Those elements are realized by executing the program by the CPU 104, the program being installed in the integrated information management apparatus 10. The integrated information management apparatus 10 further includes the FCMDB 121, a relational pattern storage 122, a registration source information storage 123, a registration waiting check list storage 124, and an inconsistency potential storage 125. The database 22 or the storages may be provided by using the auxiliary storage device 102 or a storage device connected to the integrated information management apparatus 10 via a network.

The register 111 registers the data in the FCMDB format into the FCMDB 121 as the CI in response to register requests by the MDRs 21. The register 111 further registers relationships (dependency relations) between the data relevant to the register requests into the FCMDB 121 as the relationships between the CIs. The searcher 112 searches for the CI in the FCMDB 121 based on a search condition designated in a search request, and reports the search result.

The relational pattern generator 113 generates (or extracts) a pattern of a relationship between CI types (hereinafter "relational pattern") based on a relationship between CIs registered in the FCMDB 121, and stores the relational pattern into the relational pattern storage 122. The "pattern of a relationship between CI types" refers to the information indicating whether the CI of each CI type has a relationship with the CI of any other CI type.

However, the number of the relational patterns of one CI type is not limited to one. This is because even the CIs belonging to the same CI type may form (have) different relational patterns from each other. Herein, the CI type refers to a kind or a data type of the CI. For example, the CI type depends on a kind (type) of the configurational elements of the IT system.

The relational pattern generator 113 further generates (or extracts) corresponding information associating the MDR 21 of the registration source of the relationships between the CIs which are the generation source of the relational patterns with the relational patterns, and records (registers) the corresponding information in the registration source information storage 123.

The consistency determinator 114 determines whether consistency exists in the CIs registered in the FCMDB 121 by referring to the relational pattern storage 122, the registration source information storage 123 and the like. In other words, the consistency determinator 114 extracts the CI having a possibility that the consistency may be lacking. The CI registered in the FCMDB 121 refers to the CI not having been used in the generation of the relational pattern. Namely, it is preferable that the relational pattern is generated after a certain number of the CIs have been registered in the FCMDB 121.

The relational pattern is generated based on the fact that some relationships are formed by the CIs registered in the FCMDB 121. Therefore, the greater the number of the samples, the higher the reliability of the relational patterns becomes. The consistency determinator 114 determines whether consistency exists in the CIs registered after the relational pattern is generated. For example, the consistency used herein may indicate that all the MDRs 21 that are to register a certain CI have registered the CI. The MDR 21 that is to register the CIs determines whether each of the CIs forms any of the relational patterns, and is specified based on the corresponding information between the relational pattern and the MDR 21.

The consistency determinator 114 registers the CI into the registration waiting check list storage 124 or the inconsistency potential storage 125, the CI not having been registered by some of the MDRs 21 that are to register the CI.

The inconsistency potential storage 125 registers the CI having a lower possibility to be registered by some of the MDRs 21 later among the CIs that have not been registered by some of the MDRs 21 that are to register the CIs.

The registration waiting check list storage 124 registers the CI other than the CIs that are to be registered into the inconsistency potential storage 125 among the CIs that have not been registered by some of the MDRs 21 that are to register the CIs.

Namely, the registration waiting check list storage 124 registers the CI other than the CI that is determined as the CI with a lower possibility to be registered by some of the MDRs 21 later among the CIs that have not been registered by some of the MDRs 21 that are to register the CIs.

The registration waiting determinator 115 also determines whether the consistency exists in the CIs registered in the registration waiting check list storage 124 after a predetermined time period has elapsed, so as to specify the CI having no consistency. Namely, the registration waiting determinator 115 determines whether the CI has been registered by some of the MDRs 21 after the predetermined time period has elapsed.

The inconsistency potential determinator 116 finally determines whether the consistency exists in the CLs registered in the inconsistency potential storage 125. Specifically, the inconsistency potential determinator 116 determines whether there exist the data corresponding to the CI in the database 22 corresponding to some of the MDRs 21 that have not registered the CI. When determining that there exist no such data, the inconsistency potential determinator 116 determines that inconsistency with respect to the CI occurs.

In the following, an example process sequence performed by the integrated information management apparatus 10 is described. First, an example process sequence executed when the CI is registered into the FCMDB 121 is described.

Figure 8:
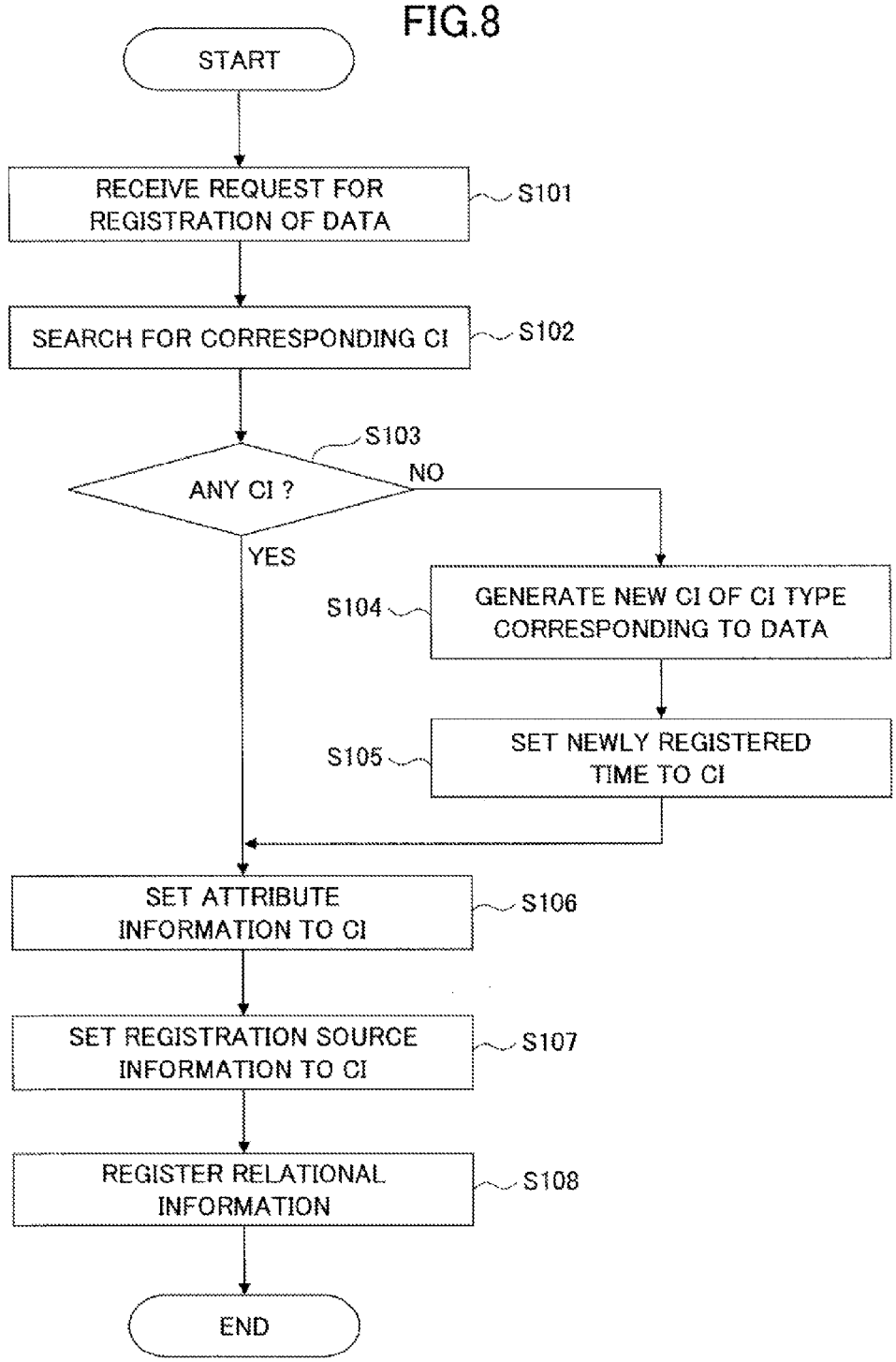
FIG. 8 is a flowchart illustrating an example registration process of a CI.

FIG. 8 is an example flowchart illustrating a CI registration process.

In step S101, the register 111 receives the registration request of the data from any of the MDRs 21. The data (hereinafter "registration data") have been converted by the MDR 21 of the registration request source in a manner such that the format of the data has been changed from the original format in the corresponding database 22 to the FCMDB format.

Next, the register 111 searches for the CI in the FCMDB 121, the CI corresponding to the registration data, based on the CI type and a value of the reconcile key set in the registration data (step S102). Herein, the reconcile key refers to an attribute item used for determining the identity of the entity (or substance) of the configurational element which is the target of the registration data in the IT system. The attribute items selected as the reconcile key may differ depending on the CI type.

When no CI corresponding to the registration data is found (NO in step S103), the register 111 generates a new CI of the CI type corresponding to the registration data in the FCMDB 121 (step S104).

Figure 9:
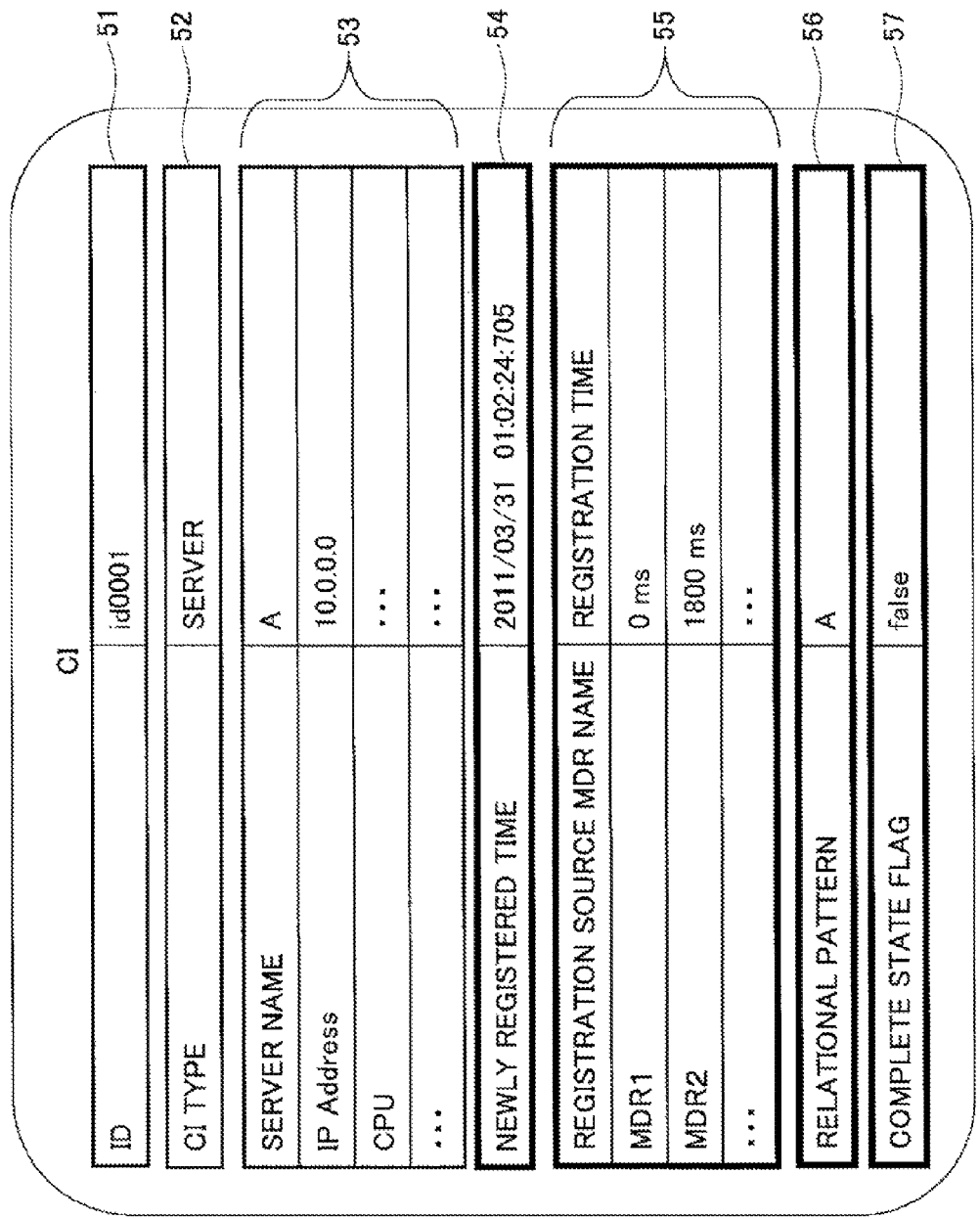
FIG. 9 illustrates an example configuration of the CI according to an embodiment.

FIG. 9 illustrates an example configuration of the CI according to an embodiment. As illustrated in FIG. 9, the CI includes items such as an ID 51, a CI type 52, attribute information 53, newly registered time 54, registration source information 55, a relational pattern 56, and a complete state flag 57.

The ID 51 is an identifier to identify the CI. A value of the ID 51 is set to a CI when the CI is generated (step S104). The CI type 52 is a type of the CI. The attribute information 53 is the information to which the attribute information set to the data integrated in the CI is integrated.

The newly registered time 54 refers to time when the CI is generated (i.e., time when the CI is (newly) registered in the FCMDB 121) or time (timing) when the data managed in the database 22 are initially integrated in the CI.

The registration source information 55 includes a registration source MDR name and registration time. The registration source MDR name refers to a name of the MDR 21 (MDR name) that registers the data into the FCMDB 121, the data being integrated in the CI. The registration time refers to an elapsed time from the newly registered time 54 to the timing when the data registered by the MDR 21 are integrated into the CI.

The relational pattern 56 refers to a name of the relational pattern corresponding to the relationship of the CI in the FCMDB 121.

The complete state flag 57 is a flag indicating whether the CI is in a complete state (true) or not (false). Herein, the complete state refers to a state where all the MDRs 21 that are to register the CI have registered the CI. Namely, any of the CIs may be registered by plural MDRs 21. The default value of the complete state flag 57 (i.e., when the CI is generated) is false.

In step S104, none of the values of the attribute information 53, the newly registered time 54, the registration source information 55, and the relational pattern 56 has been set.

Next, the register 111 inputs (sets) the current time into the newly registered time 54 of the generated CI (step S105). Then, the register 111 inputs (sets) the attribute information set in the registration data into the attribute information 53 of the generated CI (step S106). Then, the register 111 sets the registration source information 55 of the generated CI (step S107).

Specifically, the MDR name of the MDR 21 which is the registration request source of the registration data is set as the registration source MDR name, and a record having a registration time which is the elapsed time (this time zero seconds) from the newly registered time 54 is set as the registration source information 55 of the CI.

Next the register 111 registers the relational information accompanying the registration data into the FCMDB 121 as the relational information of the CI (step S108).

Figure 10:
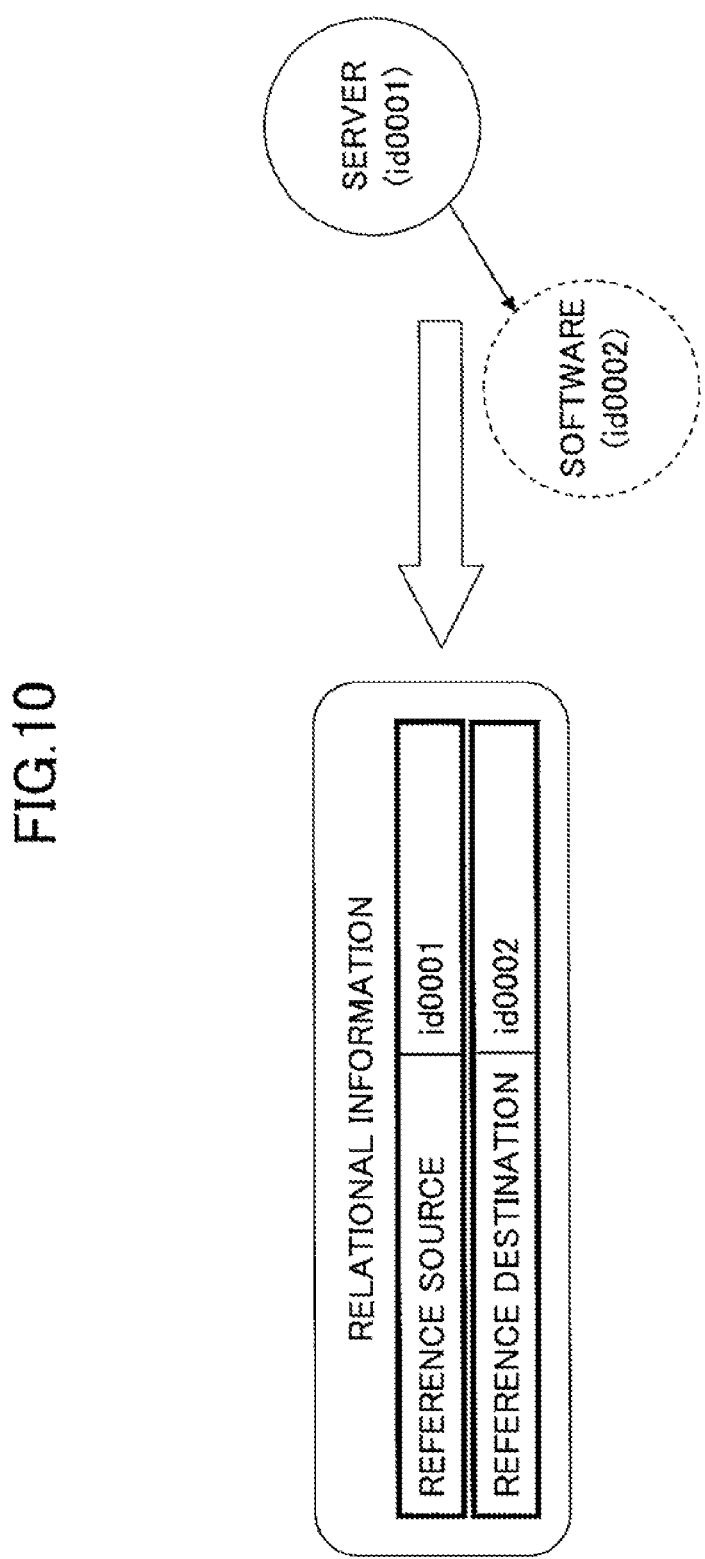
FIG. 10 illustrates example relational information of the CIs according to an embodiment.

FIG. 10 illustrates an example configuration of the relational information of the CI according to an embodiment. As illustrated in FIG. 10, the relational information includes, for example, the items of a reference source and a reference destination.

A value of the reference source refers to the ID of the CI that refers to the opposing CI, the CIs having a relationship with each other based on the relational information. A value of the reference destination refers to the CI of the CI that is referred to by the opposing CI, the CIs having a relationship with each other based on the relational information.

As it may be estimated based on the terms "reference source" and "reference destination". The relationship includes information of the direction.

Herein, the direction from the reference source to the reference destination refers to the forward direction, and the direction from the reference destination to the reference source refers to the backward direction.

In FIG. 10, an example of the registered relational information where the CI of FIG. 9 is the CI to be registered; the ID of the CI which is set as the reference source is "id0002"; and the reference destination is the CI having the CI type "software".

On the other hand, when the CI corresponding to the registration data is searched for and found (YES in step S103), the register 111 performs the processes of steps S106 through S108 on the searched for and found CI. Therefore, the attribute information set in the registration data is added to the attribute information 53 of the CI (step S106).

Further, the MDR name of the MDR 21 which is the registration request source of the registration data is set as the registration source MDR name, and a record having a registration time which is the elapsed time from the newly registered time 54 is added to the registration source information 55 of the CI. The case where the CI corresponding to the registration data refers to the case where the CI has already been registered by another MDR 21 that is to be the registration source of the CI.

Next, a relational pattern generation process is described with reference to FIG. 11. FIG. 11 is a flowchart illustrating an example relational pattern generation process.

The relational pattern generator 113 (FIG. 7) waits for until the total number of the registered CIs exceeds a predetermined threshold value (step S201). Unless a certain number of the CIs are registered, sufficient reliability of the relational patterns generated based on the FCMDB 121 may not be obtained. Therefore, for example, the process of step S201 may be performed whenever the CI is registered into the FCMDB 121 (i.e., whenever the process of FIG. 8 is executed).

When the total number of the CIs registered in the FCMDB 121 exceeds the predetermined threshold value (YES in step S201), the relational pattern generator 113 the extracts a CI being registered in the FCMDB 121 and having the relational information being relevant to an objective CI and not having been changed for a certain period of time (step S202).

In other words, the CI having the relational information that has not been changed for the certain period of time from among the CIs registered in the FCMDB 121, the relational information indicating the relationship with the objective CI, is extracted by the relational pattern generator 113. The objective CI may be determined by, for example, extracting the relational information of the CIs from the FCMDB 121 every certain period, and determining whether the relational information extracted in a previous time differs from the corresponding relational information extracted this time.

The relational information of the CI refers to the relational information in which the CI is set as the reference source or the reference destination. Further, the state of the "relational information relevant to the CI and not being changed for a certain period of time" refers to a state where no update or deletion of the existing relational information of the CI is performed and no addition of the relational information of the CI is performed. Namely, in step S202, the CI having stable relationships with other CIs is extracted.

Next, a loop process in steps S203 through S208 is performed for each of the extracted CIs. Hereinafter, the CI to be processed in the loop process may be called a "target CI".

In step S203, the relational pattern generator 113 generates the relational pattern based on the relationships between the target CI and all the ICs having the relationships with the target CI (hereinafter referred to as a "relevant CIs"). Namely, the relational pattern refers to a pattered relationship between the target CI and each of the relevant CIs as the relationship between the CI type of the target CI and the CI type of each of the relevant CIs.

In other words, the relational pattern refers to a combination between the CI type of the target CI and the CI type of each of the relevant CIs. However, the combination includes the direction of the relationship. Further, the CI having the relationship with the target CI refers to the CI which is the reference target or the reference destination of the target CI.

Next, the relational pattern generator 113 determines whether the relational pattern corresponding to the generated relational pattern has been registered in the relational pattern storage 122 (step S204). Namely, it is determined whether the generated relational pattern is a new relational pattern or is equal to an existing relational pattern.

FIG. 12 illustrates an example configuration of the relational pattern storage 122. As illustrated in FIG. 12, the relational pattern storage 122 includes (stores) a CI type name and information of one or more relational patterns (relational pattern information) for each CI type. The CI type name is an identification name of the CI type.

The relational pattern information includes a pattern name, and a section and a CI type name for each of relevant CI types. The term "relevant CI type" herein refers to the CI type which forms the relational pattern with an object CI type. The section indicates whether the relevant CI type corresponds to the reference source or the reference destination.

For example, the relational pattern information Ra and Rb in FIG. 12 correspond to the relational patterns A and B as illustrated in FIG. 13.

FIG. 13 illustrates an example of the relational patterns. As illustrated in FIG. 13, in the relational pattern A, when viewed from the server, the physical server and the service correspond to the reference source, and the software corresponds to the reference destination. The relationships illustrated in the relational pattern A correspond to the relational pattern information Ra of FIG. 12.

Also in FIG. 13, in the relational pattern B, when viewed from the server, the domain corresponds to the reference source, and the patch and the software correspond to the reference destination. The relationships illustrated in the relational pattern B correspond to the relational pattern information Rb of FIG. 12.

In step S204, when no relational pattern information corresponding to the relational pattern information of the generated relational pattern is registered in the relational pattern storage 122, it is determined that the generated relational pattern has not been registered (i.e., a new relational pattern).

On the other hand, when there is the relational pattern information that corresponds to the relational pattern information of the generated relational pattern and that is registered in the relational pattern storage 122, it is determined that the generated relational pattern corresponds to the existing relational pattern.

When determining that the relational pattern corresponding to the generated relational pattern has not been registered in the relational pattern storage 122 (NO in step S204), with respect to the CI type of the target CI, the relational pattern generator 113 registers (records) the relational pattern information corresponding to the generated relational pattern into the relational pattern storage 122 (step S205). Upon the registration of the relational pattern information, the pattern name of the relational pattern is determined.

Next, the relational pattern generator 113 sets (inputs) the pattern name of the generated relational pattern or the pattern name of the existing relational pattern corresponding to the generated relational pattern (hereinafter referred to as a "target relational pattern" when those pattern names are not required to be distinguished) into the value of the relational pattern 56 of the target CI (step S206).

Next, the relational pattern generator 113 acquires the registration source information 55 of the target CI (step S207). Namely, the MDR name of the MDRs 21 having registered the target CI and the registration time of the MDRs 21 are acquired. Then, based on the acquired MDR name and registration time, the relational pattern generator 113 updates the stored contents in the registration source information storage 123 (step S208).

FIG. 14 illustrates an example configuration of the registration source information storage 123. As illustrated in FIG. 14, the registration source information storage 123 stores CI types names and statistical information for each of one or more relational patterns corresponding to the CI types. The statistical information relates to the registration of the CIs and the relationships between the CIs which are the bases of the relations patterns. The statistical information of the relational pattern includes the sum (total number) and the statistical information for each of the registration MDRs.

The sum refers to the sum of the relationships between the CIs corresponding to the relational patterns. Namely, when the target relational pattern corresponds to a new relational pattern, in step S208, a record (a row) for storing the statistical information corresponding to the relational pattern is added to the CI type of the target CI, and a value "1" is recorded as the sum in the record.

On the other hand, when the target relational pattern corresponds to an existing relational pattern, in step S208, a value "1" is added to the sum corresponding to the relational pattern.

The statistical information for each of the registration source MDRs includes a registration MDR name, average registration time, and the number of registrations for each of the MDRs 21 (registration source MDR) having registered the relationships between the CIs which are bases of the relational pattern.

The registration MDR name refers to the MDR name of the registration source MDR. The average registration time refers to an averaged time period until the registration source MDR registers the CI of the CI type with respect to the relational pattern. The number of registrations refers to the number of the registered CIs of the CI type with respect to the relational pattern.

Namely, when the target relational pattern is a new relational pattern, in step S208, with respect to the record newly generated to store the statistical information of the relational pattern, the records for each of the MDRs 21 are generated, the number of MDRs 21 being the same as the number of the MDR names acquired in step S207.

The registration MDR names of the records for each of the MDRs 21, the MDR names acquired in step S207 in response to the average registration time, and the registration time are recorded. Further, a value "1" in response to the number of registrations of the records for each of the MDRs 21 is recorded.

On the other hand, when the target relational pattern corresponds to an existing relational pattern, in step S208, the average registration time and the number of registrations of the records for each of the MDRs 21 in the records to store the statistical information corresponding to the relational pattern are updated. Namely, the average registration time is updated based on the value acquired in step S207. The value of the number of registrations is incremented by one.

When the average registration time is described more specifically, a first value is calculated by multiplying the existing average registration time by the existing number of registrations, and a second value acquired in step S207 is added to the first value to obtain a third value. Then, the updated average registration time is acquired by dividing the third value by a value (=the existing number of registrations+1).

The average registration time is information indicating differences between the timings when data are registered between the MDRs 21 registering the data corresponding to the same entity. Namely, plural data to be integrated into the same CI are not always registered at the same time (timing). For example, depending on the operations of the databases 22, the timings when the MDRs 21 register the corresponding data may differ from each other.

In FIG. 14, with respect to the differences, the average values are used. However, any other appropriate statistical amount may be used. For example, in place of the average registration time, the latest maximum value of the registration time may be recorded in the registration source information storage 123.

As described above, the statistical information of the registration for each of the MDRs 21 having registered the CI which is the base of the formed relational pattern and the relationships between the CIs is recorded in the registration source information storage 123.

When the processes of steps S203 through S208 are performed on each of the CIs extracted in step S202, the process of FIG. 11 is completed.

Next is a discussion of a checking process of determining whether there is consistency in the CI by using the relational pattern storage 122, the registration source information storage 123 and the like.

Figure 15:
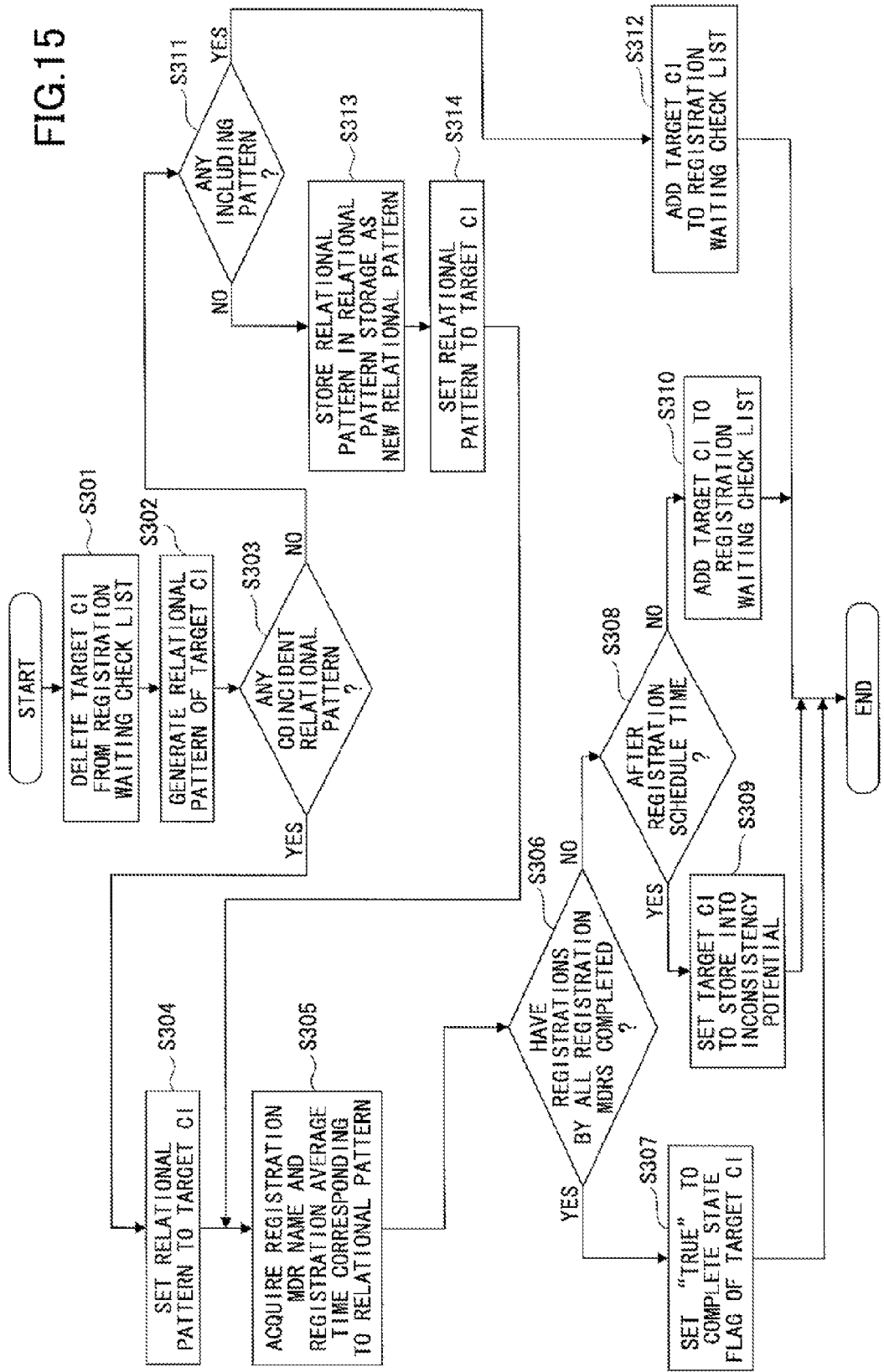
FIG. 15 is a flowchart illustrating an example process of checking consistency.

FIG. 15 is a flowchart illustrating an example process of checking the consistency. The process of FIG. 15 is performed on each of the CIs registered in the FCMDB 121 after the generation of the relational pattern. Preferably, the process is executed when the CIs are registered.

However, the process may be executed asynchronously with the registration of the CIs, for example, at a constant frequency. When the process is executed at a constant frequency, the process of FIG. 15 is repeatedly executed for the CIs having the value of the complete state flag 57 false. In FIG. 15, a single CI to be processed is called a "target CI".

In step S301, the consistency determinator 114 deletes the record of the target CI in the registration waiting check list storage 124. However, if there is no target CI registered in the registration waiting check list storage 124, nothing is executed. As described below, in the process of FIG. 15, when determining that there is the MDR 21 that has not registered the target CI among the MDRs 21 that are to register the target CI, the record of the target CI and the MDR 21 are registered in the registration waiting check list storage 124.

Therefore, in step S301, the record registered when the process of FIG. 15 with respect to the target CI is executed in the previous time is deleted from the registration waiting check list storage 124.

Next, the consistency determinator 114 generates the relational pattern indicating the combination between the CI type of the target CI and the CI type of the CI having a relationship with the target CI in the FCMDB 121 as of this time point (step S302). In the following, the generated relational pattern is referred to as a "target relational pattern".

However, at this time point, no information of the target relational pattern is registered in the relational pattern storage 122. This is because the target relational pattern is the relational pattern to be compared with the relational pattern registered in the relational pattern storage 122.

Next, the consistency determinator 114 determines whether the relational pattern corresponding to the target relational pattern is stored in the relational pattern storage 122 (FIG. 12) (step S303). Namely, the consistency determinator 114 searches for the relational pattern in the relational pattern storage 122, the relational pattern including the combination of the CI type of the reference source and the CI type of the reference destination, the combination being (completely) coincident with the combination of the CI type of the reference source and the CI type of the reference destination of the target reference pattern.

When the relational pattern (completely) coincident with the target relational pattern (hereinafter "coincident pattern") is stored in the relational pattern storage 122 (YES in step S303), the pattern name of the coincident pattern is set as the value of the relational pattern 56 of the target CI (step S304). Next, the consistency determinator 114 acquires a list of the registration MDR names and a list of the average registration times registered with respect to the coincident pattern (step S305).

Next, the consistency determinator 114 determines whether all the MDRs 21 that are to register the target CI have registered the target CI (step S306). Specifically, the consistency determinator 114 compares the list of the registration MDR names acquired in step S305 with the list of the MDR names set with respect to the target CI, and determines whether those lists are coincident with each other.

However, among the registration MDR names registered with respect to the coincident pattern, the registration MDR name having a registration source existence degree being less than a threshold value (e.g., 100%) may be excluded from the target of the comparison, the registration source existence degree being calculated based on the following formula (1).

Registration source existence degree=(the Number of registrations)/Sum     (1)

Herein, the number of registrations and the sum are values stored in the registration source information storage 123. FIG. 14 illustrates calculation results of the registration source existence degree of the corresponding registration MDR names of the relational patterns.

Namely, the MDR 21 of the registration MDR name having the registration source existence degree less than the threshold value does not always register the CI forming the coincident pattern or having low possibility of registering the CI forming the coincident pattern. Therefore, it may not be appropriate if the registration conducted by such an MDR 21 is necessary to approve the consistency with respect to the target CI.

Specifically, for example, when the coincident pattern is the relational pattern A of FIG. 14, the MDR 214 is excluded from the comparison target, and it is determined whether the MDRs 211, 212, and 213 are registered in the target CI.

Further, when the total number of the coincident patterns stored in the registration source information storage 123 less than a predetermined threshold value, the process after step S306 may not be executed, and the process of FIG. 15 may be terminated. Namely, when the total number of the coincident patterns is small, it is thought that the reliability of the relational patterns may be insufficient.

Therefore, the determination of the existence of the consistency based on the relational patterns having a low reliability may have to be avoided. In this case, therefore, the existence of the consistency of the target CI is not confirmed (determined).

When determining that all the MDRs 21 that are to register the target CI have registered the target CI (YES in step S306), namely when the list of the registration MDR names acquired in step S305 coincide with the list of the MDR names set in the target CI, the process goes to step S307.

In step S307, the consistency determinator 114 sets a value "true" to the he CIs having the value of the target CI. Namely, the consistency determinator 114 determines that the registration state of the target CI corresponds to a complete state (i.e., the state where the consistency exists). In this case, the data of the target CI are directly stored in the FCMDB 121.

On the other hand, when determining that at least a part (one) of the MDRs 21 that are to register the target CI have not registered the target CI (NO in step S306), namely when there is a shortage in the list of the MDR names set in the target CI in comparison with the list of the registration MDR names acquired in step S305, the process goes to step S308.

In step S308, the consistency determinator 114 determines whether there is any MDR 21 having a registration schedule time later than current time from among the MDRs determined as the deficient MDR in step S305. Further, the registration schedule time is determined based on the following formula (2) for each deficient MDR.

$$\text{Registration schedule time} = (\text{Newly registered time}) + (\text{Average registration time}) \times \text{Sum}/(\text{the Number of registrations}) \quad (2)$$

The newly registered time is acquired from the target CI. The average registration time, the sum, and the number of registrations are values stored in the registration source information storage 123 for each deficient MDR with respect to the coincident pattern. Further, the term "Sum/(the Number of registrations)" is provided to reduce the average registration time in response to the registration source existence degree (i.e., to reduce the wait time to confirm (determine) whether there is the existence of consistency).

Namely, the term "Sum/(the Number of registrations)" is provided to reduce the time to wait for the registration by the MDR 21 which does not always register the target CI. However, in the determination in step S306, if the MDR 21 having the registration source existence degree less than 100% is excluded from the comparison target, the value of the term "Sum/(the Number of registrations)" is always one. Therefore, in this case, the term "Sum/(the Number of registrations)" may be removed from the formula (2).

When determining that there is any deficient MDR 21 having the registration schedule time later than current time (YES in step S308), the ID of the target CI is added to the inconsistency potential storage 125 (step S309). Namely, the CI having higher possibility to cause inconsistency is extracted into the inconsistency potential storage 125.

When determining that there is no deficient MDR 21 having the registration schedule time later than current time (NO in step S308), the consistency determinator 114 stores the registration schedule time, the MDR name of the deficient MDR 21, and the ID of the target CI into the registration waiting check list storage 124 (step S310).

Namely, the CI that does not always cause the inconsistency and that does not always have the consistency is extracted into the registration waiting check list storage 124. Therefore, it may be thought that the possibility of occurrence of the inconsistency is detected.

FIG. 16 illustrates an example configuration of the registration waiting check list storage 124. As illustrated in FIG. 16, the registration waiting check list storage 124 includes the registration schedule time, a registration waiting MDR, and the ID of the CI for each of the CIs which are treated as the target CIs in the process of FIG. 15.

When there are plural deficient MDRs 21, the registration schedule time refers to the registration schedule time of the deficient MDR 21 having the latest registration schedule time. In other words, the registration schedule time is the time limit to wait for the registration of the deficient MDR 21. The registration waiting MDR is a list of the MDR names of the deficient MDRs 21.

On the other hand, when determining that there is no relational pattern corresponding to the target relational pattern stored in the relational pattern storage 122 (NO in step S303), the consistency determinator 114 determines whether the relational pattern including the target relational pattern (hereinafter "including pattern") is stored in the relational pattern storage 122 (step S311).

Figure 17:
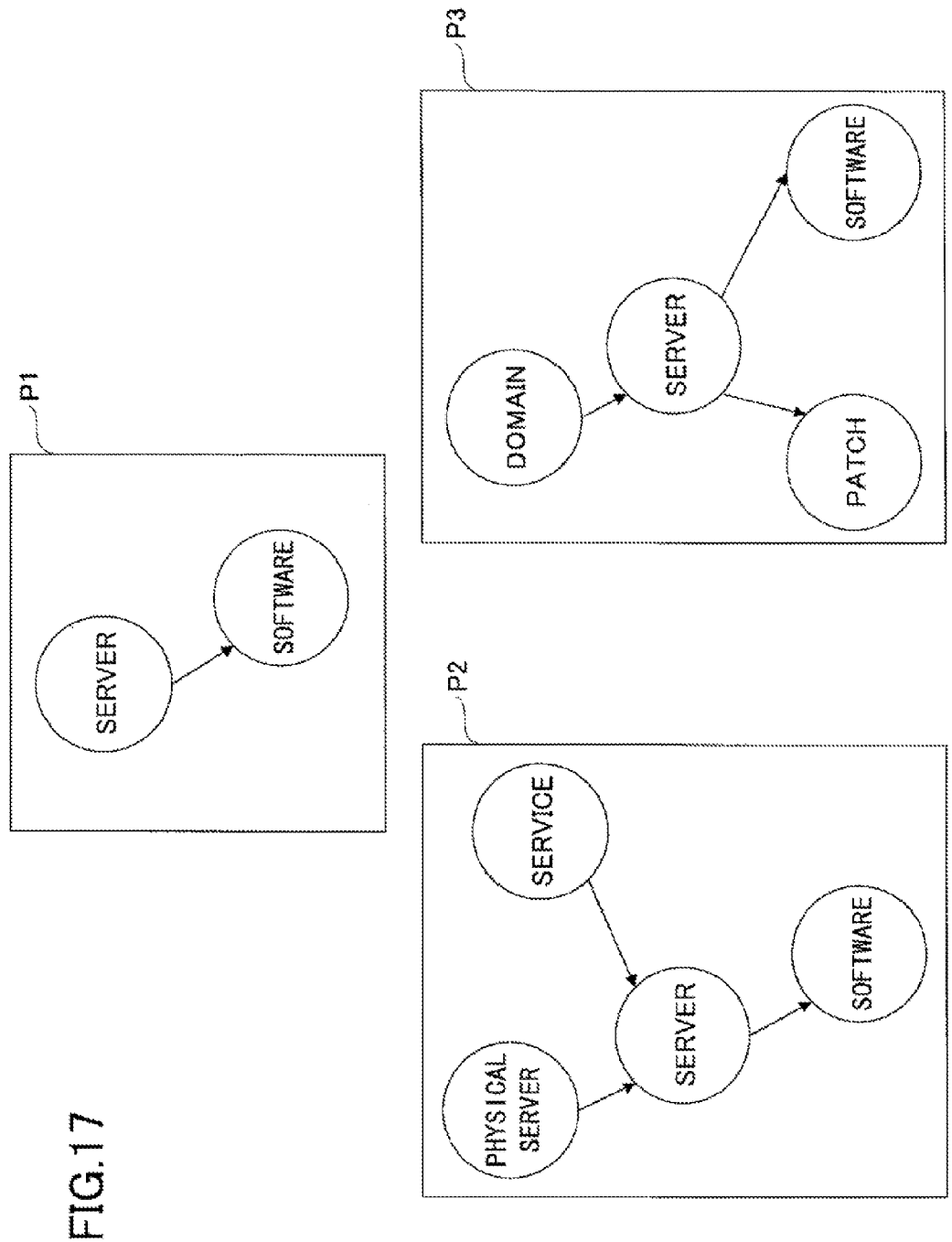
FIG. 17 illustrates an example of an including pattern.

FIG. 17 illustrates an example including pattern. In FIG. 17, the relational pattern P1 is assumed to be the target relational pattern. In the target relational pattern P1, the server is the reference source, and the software is the reference destination.

In this case, relational patterns P2 and P3 correspond to the including pattern of the target relational pattern P1. Namely, both of the relational patterns P2 and P3 include the relationship in which the server is the reference source and the software is the reference destination.

The including pattern is the relational pattern which is expected to be formed when the target CI is in the complete state. Namely, the determination in step S311 corresponds to the determination whether the target relational pattern currently formed by the target CI is in a state in the middle of forming the existing relational pattern.

The registration of the CI by the MDRs 21 may be executed in different timings. Therefore, depending on the relationship between the difference due to the different timings and the timing when the process of FIG. 15 is executed, although the inconsistency does not occur, there is a possibility that the target CI is not in the complete state. Therefore, to determine whether the state of target CI approaches the complete state, the existence of the including pattern is determined.

When the including pattern of the target relational pattern is stored in the relational pattern storage 122 (YES in step S311), the consistency determinator 114 stores the record corresponding to the target CI into the registration waiting check list storage 124 (step S312).

In this case, the consistency determinator 114 acquires the MDR name and the average registration time of the MDR 21 having the shortest average registration time in the registration source information storage 123. The consistency determinator 114 calculates the registration schedule time based on the longest average registration time among the average registration times of the MDRs 21 waiting for the registration.

On the other hand, when determining that there is no including pattern of the target relational pattern stored in the relational pattern storage 122 (NO in step S311), the consistency determinator 114 determines that the target relational pattern is a new relational pattern, and stores the record with respect to the target relational pattern into the relational pattern storage 122 (step S312). In this case, the contents of the registration source information storage 123 are also updated. Next, the consistency determinator 114 sets the pattern name of the target relational pattern as the value of the relational pattern 56 of the target CI (step S313).

As described above, according to this embodiment, based on the relational pattern, the MDR 21 that is to register is determined. Here, adequacy or rationality for determining the MDR 21 that is to register based on the relational pattern is described.

As may be apparent from FIG. 11, the relational pattern is generated based on the CIs registered in the FCMDB 121 and the relations between the CIs. Here, the CIs and the relationships between the CIs correspond to the integration of the data of the databases 22 and the relationships between the data. Therefore, the relational pattern may be referred to as the information allowing to specify the combination between the data that are formation sources of the relational patterns and the database 22 storing the relationships between the data. Further, the MDRs 21 have one-to-one correspondence with the database 22.

Therefore, the relational pattern may be referred to as the information allowing to specify the combination of the MDRs 21 that are to register the CIs forming the relation corresponding to the relational pattern and the relations between the CIs. Therefore, when it becomes possible to specify that the relationships between the CI registered in the FCMDB 121 and the other CIs correspond to any of the relational patterns, based on the specified relational pattern, it may become possible to specify the relational pattern that is to register the CI.

Next, a process of checking the consistency of the CIs registered in the registration waiting check list storage 124 is described.

Figure 18:
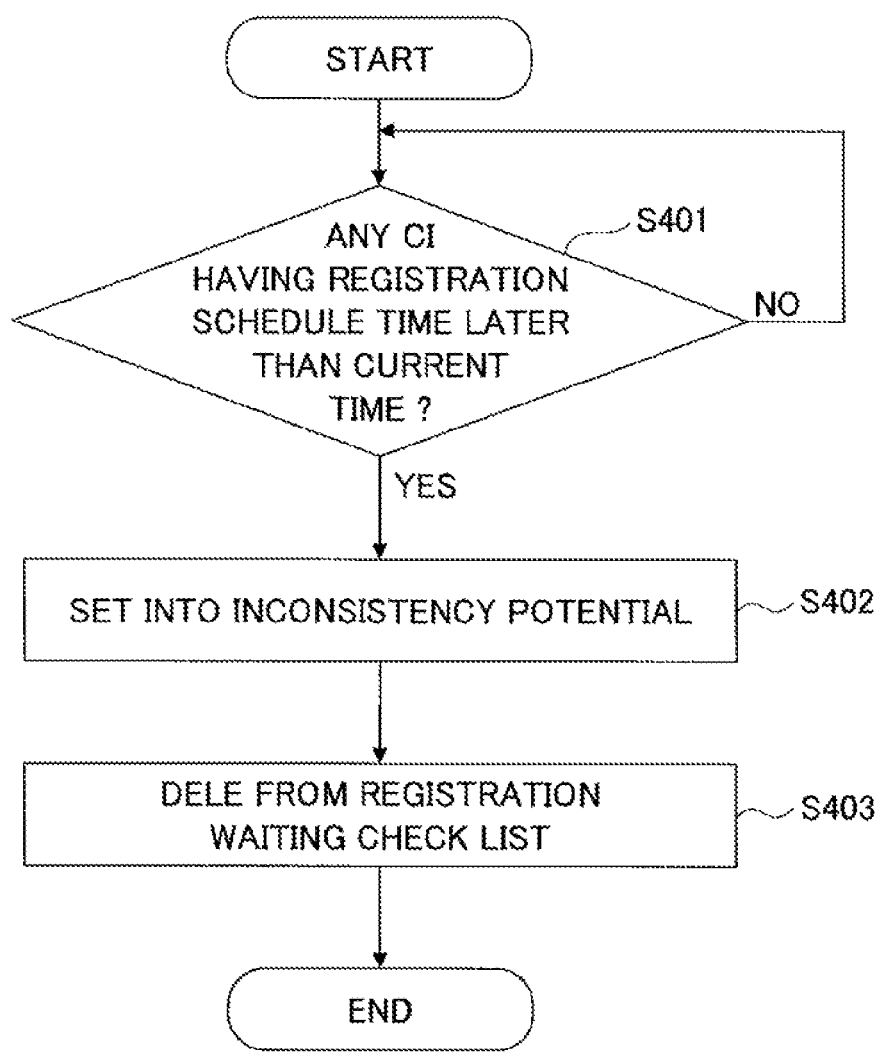
FIG. 18 is a flowchart illustrating an example process of checking the consistency of the CI registered in a registration waiting check list.

FIG. 18 is a flowchart illustrating an example process of checking the consistency of the CIs registered in the registration waiting check list storage 124. For example, the process of FIG. 18 may be executed asynchronously with the process of FIG. 15.

Therefore, the process of FIG. 18 may be executed parallel to the process of FIG. 15. However, when the process of FIG. 15 is executed asynchronously with the timings of the registrations of the CIs (e.g., at a constant frequency), the process of FIG. 18 may be executed after the execution of the process of FIG. 15.

In step S401, the registration waiting determinator 115 monitors the registration waiting check list storage 124, and determines whether there is the CI having the registration schedule time later than current time. For example, the registration waiting determinator 115 periodically refers to the registration waiting check list storage 124, and compares the time at that time (current time) with the registration schedule time of each CI registered in the registration waiting check list storage 124, so as to detect the existence of the CI having the registration schedule time later than current time.

When determining that the CI having the registration schedule time later than current time exists (YES in step S401), the registration waiting determinator 115 adds the ID of the CI to the inconsistency potential storage 125 (step S402). Namely, after the CI is registered into the registration waiting check list storage 124, when the registration with respect to the CI is executed, the process of checking the consistency of FIG. 15 is executed.

After the process of checking the consistency is executed, in step S301, the record with respect to the CI is deleted (removed) from the registration waiting check list storage 124. Then, only when the inconsistency of the CI is detected again, the CI is registered into the registration waiting check list storage 124.

Regardless of the above, when the record of the CI is being registered in the registration waiting check list storage 124 and the registration schedule time is elapsed, it may be thought that there is a possibility of a failure has occurred in the database 22 corresponding to at least one of the MDRs 21 that are to register the CI. Therefore, the CI is specified as the CI having higher possibility of the occurrence of the inconsistency, and the ID of the CI is registered into the inconsistency potential storage 125.

Next, the registration waiting determinator 115 deletes the record of the CI from the registration waiting check list storage 124 (step S403).

Next, a process of checking the consistency of the CI registered in the inconsistency potential storage 125 is described.

FIG. 19 is a flowchart illustrating an example process of checking the consistency of the CI registered in the inconsistency potential storage 125. The process of FIG. 19 may be executed at the timing including the timing when the CI is registered in the inconsistency potential storage 125, at a constant frequency or the like. When the process of FIG. 19 is executed at a constant frequency, the process of FIG. 19 may be executed on the CI registered after the process executed last time.

In step S501, the inconsistency potential determinator 116 acquires one ID from the inconsistency potential storage 125, and further acquires (the information of) the CI corresponding to the ID from the FCMDB 121. Then, the inconsistency potential determinator 116 tries to acquire the data of the CI (hereinafter referred to as a "target CI") based on the databases 22 corresponding to one or more MDRs 21 not having registering the target CI among the MDRs 21 that are to register the target CI (step S502). The acquisition of the data from the databases 22 are executed via the MDRs 21 corresponding to the databases 22.

Further, the MDR 21 that is to register the target CI may specify the MDR name by referring to the item of the registration MDR of the registration source information storage 123 with respect to the relational pattern set in the target CI. Further, an unregistered MDR may be specified by comparing the MDR names of the MDRs 21 that are to register the target CI and the MDR names set with respect to the target CI.

When determining that all the data having been attempted to be acquired are acquired (YES in step S503), the inconsistency potential determinator 116 registers the CI into the FCMDB 121, the CI being based on the acquired data (step S504). The CI is integrated into the target CI. Then, the inconsistency potential determinator 116 deletes the IC of the target CI from the inconsistency potential storage 125 (step S505). Next, the consistency determinator 114 performs (executes) the process of checking the consistency described in FIG. 15 on the target CI (step S506). Due to the new registration of the target CI, the existence of the consistency after the registration is determined.

On the other hand, when at least one of the data having been attempted to be acquired is not acquired (NO in step S503), the inconsistency potential determinator 116 determines whether the pattern name of the relational pattern is set in the target CI (step S507). When determining that the pattern name of the relational pattern is not set in the target CI (NO in step S507), the inconsistency potential determinator 116 asks the user whether the target CI is in the complete state (step S508). For example, the inconsistency potential determinator 116 controls displaying a screen on a display (not shown), the screen including a button to accept the input indicating whether the target CI is in the complete state.

Namely, the CI registered in the inconsistency potential storage 125 while the pattern name of the relational pattern is not set corresponds to the CI registered in the registration waiting check list storage 124 (YES in step S312 (FIG. 15)) while the including pattern with respect to the current relational pattern of the CI is in the middle state (YES in step S311), and also the CI registered in the inconsistency potential storage 125 because the registration schedule time is elapsed.

On the other hand, the configuration of a group of the databases 22 storing the data to be integrated into the FCMDB 121 may vary depending on the change of the configuration of the IT system. As a result, a new relational pattern may be generated. From this point of view, the current relational pattern of the target CI may be a new relational pattern. Therefore, when the pattern name of the relational pattern of the target CI is not set, whether the current relational pattern of the target CI is a valid relational pattern is asked of and determined by the user.

When the input indicating that the target CI is in the complete state is received by the user (YES in step S509), the inconsistency potential determinator 116 deletes the ID of the target CI from the inconsistency potential storage 125 (step S510). Next, the inconsistency potential determinator 116 set a value "true" in the complete state flag 57 of the target CI (step S511). Then, the inconsistency potential determinator 116 determines that the target relational pattern is a new relational pattern, and stores the record of the target relational pattern into the relational pattern storage 122 (step S512).

In this case, the contents of the registration source information storage 123 are also updated. Next, the inconsistency potential determinator 116 sets the pattern name of the target relational pattern to be the value of the relational pattern 56 of the target CI (step S513). By doing this, the target CI is treated as the CI in the complete state.

On the other hand, when the pattern name of the relational pattern is set to be the target CI (YES in step S507), the inconsistency potential determinator 116 does not do anything to the target CI. In this case, regardless of the existence of the relational pattern corresponding to the current relational pattern of the target CI, at least one of the MDRs 21 has not registered.

Therefore, there is a high possibility of the occurrence of inconsistency with respect to the target CI. Therefore, the registration of the ID of the target CI in the inconsistency potential storage 125 is maintained. Namely, the target CI is determined as the CI where the inconsistency occurs.

At the end of the process in FIG. 19, the CI having the ID stored in the inconsistency potential storage 125 is the CI specified as the IC having a higher possibility of occurrence of the inconsistency. The CI may be displayed on the display 106 or may be output to a predetermined file. The user may refer to such list information and confirm (recognize) the existence of the CI where inconsistency may occur.

Further, for example, when the occurrence of the inconsistency is detected in a certain CI (i.e. when it is detected that the ID is stored in the inconsistency potential storage 125 at the end of the process of FIG. 19), the registration of the CI by the MDR 21 having caused the inconsistency of the CI may not be treated as valid registration after the inconsistency is detected.

In this case, there is a high possibility of the occurrence of a failure in the MDR 21 or the database 22 corresponding to the MDR 21. Therefore, after the detection of the inconsistency, even when there is a request for the registration of the data from the MDR 21 with respect to the CI or any other CI, the contents of the registration request may not be normal (correct).

Further, the MDR 21 having caused the inconsistency is the MDR 21 that is to register the CI and that has not registered even when the registration schedule time is elapsed. An example that the registration of the CI by the MDR 21 having caused the inconsistency is treated as invalid is to reject (refuse) the registration request for the registration of the data from the MDR 21.

As another example, even when the registration request is accepted and the data are integrated into the CI, so that the CI is in the complete state, the complete state flag 57 may not be set to have the value "true".

Further, for each of the items of the attribute information 53 (see FIG. 9) of the CI types, which of the MDRs 21 is the registration source may be managed. For example, in the example of FIG. 9, the attribute information 53 includes the items of the server name, the IP address, the CPU and the like. Among those, the MDR name of the MDR 21 that is to register the server name, the MDR name of the MDR 21 that is to register the IP address, and the MDR name of the MDR 21 that is to register the CPU may be managed.

In the items, values of plural MDRs 21 may be registered in the same item. For example, it is assumed that the server name is registered by each of the MDR 21a, the MDR 21b, and MDR 21c. In this case, when the inconsistency of the CI is detected due to the MDR 21b, after the recovery of the MDR 21b or the software information DB 22b corresponding to the MDR 21b, the information registered in the CI may be used. Specifically, with respect to the server name of the CI, a correct value is registered by the MDR 21a and the MDR 21c. Therefore, the value may be registered in the software information DB 22b via the MDR 21b.

In the above description, a case is described where after the process of FIG. 19 is executed, the CI where the inconsistency occurs is specified. However, the CI registered in the inconsistency potential storage 125 may be specified as the CI where the inconsistency occurs without executing the process of FIG. 19.

As described above, in this embodiment, if there is the CI to be determined whether the CI has the consistency, that has the relationship which does not correspond to the existing relational pattern, the CI is extracted into the registration waiting check list storage 124. Therefore, it may become possible to detect the possibility of inconsistency.

Further, in this embodiment, the MDR 21 that is to register the CI is determined based on the relational pattern coincident with the relationship between the CI to be determined whether the CI has the consistency and the other CI. As a result, even when the MDR 21 that is to register may not be uniquely determined based only on the CI type, it may become possible to (uniquely) determine the MDR 21 that is to register.

The case where the MDR 21 that is to register may not be uniquely determined based only on the CI type refers to a case where there are two or more combinations of the MDRs 21 that are to register with respect to the CIs belonging to the same CI type. For example, it is assumed that the configuration information management apparatus 20a, the software information management apparatus 20b, and the performance information management apparatus 20c are installed in each of the divisions. In this case, the CI of the "server A1" in the division A is registered in the FCMDB 121 by each of the MDRs 21 of the configuration information management apparatus 20a, the software information management apparatus 20b, and the performance information management apparatus 20c in the division A.

Similarly, the CI of the "server B1" in the division B is registered in the FCMDB 121 by each of the MDRs 21 of the configuration information management apparatus 20a, the software information management apparatus 20b, and the performance information management apparatus 20c in the division B. Here, the CI type of the CI of the "server A1" and the CI type of the CI of the "server B1" are the same "server". However, the registration source MDRs 21 of those two divisions are different from each other. Namely, it may not always possible to specify the registration source MDR 21 based only on the CI type.

According to this embodiment, for example, with respect to the server A1, based on the relational pattern generated based on the CI already registered with respect to other servers in the division A, it may be possible to specify (determine) the MDRs 21 of the configuration information management apparatus 20a, the software information management apparatus 20b, and the performance information management apparatus 20c in the division A as the MDRs 21 that are to register.

Similarly, with respect to the server B1, based on the relational pattern generated based on the CI already registered with respect to other server in the division B, it may be possible to specify (determine) the MDRs 21 of the configuration information management apparatus 20a, the software information management apparatus 20b, and the performance information management apparatus 20c in the division B as the MDRs 21 that are to register.

Further, the above case where the configuration information management apparatus 20a, the software information management apparatus 20b, and the performance information management apparatus 20c are provided (installed) in each of the divisions is only one case where the MDR 21 that is to register may not be uniquely determined based only on the CI type. Even in a case where the MDR 21 that is to register may not be uniquely determined based only on the CI type due to other reasons (configuration), according to an embodiment, it may become possible to determine the MDR 21 that is to register with respect to each CI corresponding to the same CI type.

All examples and conditional language recited herein are intended for pedagogical purposes to aid the reader in understanding the invention and the concepts contributed by the inventors to furthering the art, and are to be construed as being without limitation to such specifically recited examples and conditions, nor does the organization of such examples in the specification relate to a showing of superiority or inferiority of the invention. Although the embodiments of the present inventions has been described in detail, it is to be understood that various changes, substitutions, and alterations could be made hereto without departing from the sprit and scope of the invention.

What is claimed is:

1. A non-transitory computer-readable storage medium storing a program, wherein the program instructs a computer to perform a process, the process comprising:
storing first information into a storage, the first information indicating dependency relationships between types of plural configuration elements included in a system to be managed, and indicating a relational pattern of a reference source type and a reference destination type corresponding to each of the types of the configuration elements;
acquiring relational information and type information from plural databases, each database storing the relational information and the type information, the relational information indicating dependency relationships between the configuration elements included in the system to be managed and indicating a reference source configuration element and a reference destination configuration element with respect to each of the configuration elements, and the type information indicating the types of the configuration elements;
generating second information indicating dependency relationships between a certain configuration element included in the plural configuration elements and each of configuration elements indicating a dependency relationship with the certain configuration element, the dependency relationships being included in the acquired relational information;
generating third information indicating that a type of the certain configuration element, a type of the reference source configuration element of the certain configuration element, a type of the reference destination configuration element of the certain configuration element, and a type of each of the configuration elements, which are determined based on the acquired type information, have a dependency relationship indicated in the generated second information; and
determining whether the generated third information is coincident with the first information stored in the storage.

2. The non-transitory computer-readable storage medium according to claim 1,
wherein the types differ depending on at least whether each of the configuration elements included in the plural configuration elements is hardware or software.

3. The non-transitory computer-readable storage medium according to claim 1,
wherein each of the plural configuration elements is any of hardware, software, and document data.

4. The non-transitory computer-readable storage medium according to claim 1, the process further comprising:
extracting, when the third information is not coincident with the first information, the certain configuration element.

5. The non-transitory computer-readable storage medium according to claim 1, the process further comprising:
determining whether, when the third information is not coincident with the first information, the third information is coincident with the first information again after a predetermined time period has elapsed.

6. The non-transitory computer-readable storage medium according to claim 1, the process further comprising:
associating and storing, when the third information is coincident with the first information, identification information identifying a database storing the relational information and the type information with respect to the certain configuration element and the configuration elements among the plural databases with the first information into the storage;
generating fourth information indicating dependency relationships between a configuration element other than the certain configuration element and each of other configuration elements, among the plural configuration elements having a dependency relationship with the configuration element other than the certain configuration element based on the acquired relational information;

generating fifth information indicating that the configuration element other than the certain configuration element and the each of other configuration elements has the dependency relationship indicated in the generated fourth information based on the acquired type information; and determining whether, when the fifth information is coincident with the first information, the identification information identifying the database acquiring the configuration element other than the certain configuration element and each of the other configuration elements is coincident with the identification information identifying the database stored in the storage.

7. The non-transitory computer-readable storage medium according to claim 1, the process further comprising:

storing information indicating a time limit in the storage by associating the information with the identification information; and determining whether, when the identification information identifying the database acquiring the configuration elements other than the certain configuration element and each of the other configuration elements is not coincident with the identification information stored in the storage, after a time has elapsed since the time limit indicating information being associated with the identification information not included in the information identifying the database acquiring the configuration element other than the certain configuration element and each of the other configuration elements among the identification information stored in the storage and being stored in the storage, the identification information identifying the database acquiring the acquiring the configuration element other than the certain configuration element and each of the other configuration elements is coincident with the identification information stored in the storage again.

8. A determination method comprising:

storing first information into a storage, the first information indicating dependency relationships between types of plural configuration elements included in a system to be managed, and indicating a relational pattern of a reference source type and a reference destination type corresponding to each of the types of the configuration elements;

acquiring relational information and type information from plural databases, each database storing the relational information and the type information, the relational information indicating dependency relationships between the configuration elements included in the system to be managed and indicating a reference source configuration element and a reference destination configuration element with respect to each of the configuration elements, and the type information indicating the types of the configuration elements;

generating second information indicating dependency relationships between a certain configuration element included in the plural configuration elements and each of configuration elements indicating a dependency relationship with the certain configuration element, the dependency relationships being included in the acquired relational information;

generating third information indicating that a type of the certain configuration element, a type of the reference source configuration element of the certain configuration element, a type of the reference destination configuration element of the certain configuration element, and a type of each of the configuration elements, which are determined based on the acquired type information, have a dependency relationship indicated in the generated second information; and determining whether the generated third information is coincident with the first information stored in the storage.

9. The determination method according to claim 8, wherein the types differ depending on at least whether each of the configuration elements included in the plural configuration elements is hardware or software.

10. The determination method according to claim 8, wherein each of the plural configuration elements is any of hardware, software, and document data.

11. The determination method according to claim 8, further comprising:

extracting, when the third information is not coincident with the first information, the certain configuration element.

12. The determination method according to claim 8, further comprising:

determining whether, when the third information is not coincident with the first information, the third information is coincident with the first information again after a predetermined time period has elapsed.

13. The determination method according to claim 8, further comprising:

associating and storing, when the third information is coincident with the first information, identification information identifying a database storing the relational information and the type information with respect to the certain configuration element and the configuration elements among the plural databases with the first information into the storage;

generating fourth information indicating dependency relationships between a configuration element other than the certain configuration element and each of other configuration elements, among the plural configuration elements having a dependency relationship with the configuration element other than the certain configuration element based on the acquired relational information;

generating fifth information indicating that the configuration element other than the certain configuration element and the each of other configuration elements has the dependency relationship indicated in the generated fourth information based on the acquired type information; and determining whether, when the fifth information is coincident with the first information, the identification information identifying the database acquiring the configuration element other than the certain configuration element and each of the other configuration elements is coincident with the identification information identifying the database stored in the storage.

14. The determination method according to claim 8, further comprising:

storing information indicating a time limit in the storage by associating the information with the identification information; and determining whether, when the identification information identifying the database acquiring the configuration elements other than the certain configuration element and each of the other configuration elements is not coincident with the identification information stored in the storage, after a time has elapsed since the time limit indicating in information being associated with identification information not included in the information identifying the database acquiring the configuration element other than the certain configuration element and each of the other configuration elements among the identification information stored in the storage and being stored in the storage, the identification information identifying the database acquiring the acquiring the configuration element other than the certain configuration element and each of the other configuration elements is coincident with the identification information stored in the storage again.

15. An apparatus comprising:

a storage configured to store first information indicating dependency relationships between types of plural configuration elements included in a system to be managed, and indicating a relational pattern of a reference source type and a reference destination type corresponding to each of the types of the configuration elements; and a processor configured to acquire relational information and type information from plural databases, each database storing the relational information and the type information, the relational information indicating dependency relationships between the configuration elements included in the system to be managed and indicating a reference source configuration element and a reference destination configuration element with respect to each of the configuration elements, and the type information indicating the types of the configuration elements;

generate second information indicating dependency relationships between a certain configuration element included in the plural configuration elements and each of configuration elements indicating a dependency relationship with the certain configuration element, the dependency relationships being included in the acquired relational information;

generate third information indicating that a toe of the certain configuration element, a toe of the reference source configuration element of the certain configuration element, a type of the reference destination configuration element of the certain configuration element, and a type of each of the configuration elements, which are determined based on the acquired type information, have a dependency relationship indicated in the generated second information; and determine whether the generated third information is coincident with the first information stored in the storage.

16. The apparatus according to claim 15, wherein the types differ depending on at least whether each of the configuration elements included in the plural configuration elements is hardware or software.

17. The apparatus according to claim 15, wherein each of the plural configuration elements is any of hardware, software, and document data.

18. The apparatus according to claim 15, wherein the processor is further configured to, when the third information is not coincident with the first information, extract the certain configuration element.

19. The apparatus according to claim 15, wherein the processor is configured to determine whether the third information is coincident with the first information again after a predetermined time period has elapsed when the third information is not coincident with the first information.

20. The apparatus according to claim 15, wherein the storage is configured to, when the third information is coincident with the first information, associate and store identification information identifying a database storing the relational information and the type information with respect to the certain configuration element and the configuration elements among the plural databases with the first information into the storage;

wherein the processor is further configured to generate fourth information indicating dependency relationships between a configuration element other than the certain configuration element and each of other configuration elements, among the plural configuration elements having a dependency relationship with the configuration element other than the certain configuration element based on the acquired relational information, and generate fifth information indicating that the configuration element other than the certain configuration element and the each of other configuration elements has the dependency relationship indicated in the generated fourth information based on the acquired type information; and wherein the processor is configured to determine whether, when the fifth information is coincident with the first information, the identification information identifying the database acquiring the configuration element other than the certain configuration element and each of the other configuration elements is coincident with the identification information identifying the database stored in the storage.

* * * * *